US008769023B2

(12) United States Patent
Lau

(10) Patent No.: US 8,769,023 B2
(45) Date of Patent: Jul. 1, 2014

(54) DISASTER RESPONSE SYSTEM

(75) Inventor: Samuel Lau, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 380 days.

(21) Appl. No.: 13/197,646

(22) Filed: Aug. 3, 2011

(65) Prior Publication Data
US 2013/0036175 A1 Feb. 7, 2013

(51) Int. Cl.
*G06F 15/16* (2006.01)
*G06F 15/177* (2006.01)
*H04M 11/04* (2006.01)

(52) U.S. Cl.
USPC ...... 709/206; 709/221; 455/404.1; 455/404.2

(58) Field of Classification Search
USPC ............... 709/206, 221; 455/404.1, 404.2
See application file for complete search history.

(56) References Cited

U.S. PATENT DOCUMENTS

| | | | | |
|---|---|---|---|---|
| 5,127,045 A * | 6/1992 | Cragun et al. | ............... | 379/67.1 |
| 5,708,655 A * | 1/1998 | Toth et al. | ...................... | 370/313 |
| 5,896,376 A * | 4/1999 | Alperovich et al. | ........... | 370/348 |
| 5,914,656 A * | 6/1999 | Ojala et al. | ..................... | 340/521 |
| 6,002,748 A * | 12/1999 | Leichner | ......................... | 379/48 |
| 6,023,223 A * | 2/2000 | Baxter, Jr. | ..................... | 340/531 |
| 6,031,455 A * | 2/2000 | Grube et al. | ............. | 340/539.26 |
| 6,052,591 A * | 4/2000 | Bhatia | ............................. | 455/445 |
| 6,084,510 A * | 7/2000 | Lemelson et al. | ....... | 340/539.13 |
| 6,097,288 A * | 8/2000 | Koeppe, Jr. | ................... | 340/517 |
| 6,148,212 A * | 11/2000 | Park et al. | ................... | 455/456.1 |
| 6,198,931 B1 * | 3/2001 | Smith et al. | ..................... | 455/445 |
| 6,252,510 B1 * | 6/2001 | Dungan | ........................ | 340/632 |
| 6,255,942 B1 * | 7/2001 | Knudsen | ....................... | 340/506 |
| 6,392,538 B1 * | 5/2002 | Shere | ....................... | 340/539.26 |
| 6,914,525 B2 * | 7/2005 | Rao et al. | ....................... | 340/531 |
| 7,180,415 B2 * | 2/2007 | Bankert et al. | ........... | 340/539.17 |
| 7,221,928 B2 * | 5/2007 | Laird et al. | ................. | 455/404.1 |
| 7,233,781 B2 * | 6/2007 | Hunter et al. | .............. | 455/404.1 |
| 7,301,450 B2 * | 11/2007 | Carrino | ..................... | 340/539.11 |
| 7,643,834 B2 * | 1/2010 | Ioppe et al. | ................ | 455/456.3 |
| 7,791,474 B2 * | 9/2010 | Saito | ............................. | 340/540 |
| 7,825,791 B2 * | 11/2010 | Kim et al. | ...................... | 340/500 |
| 7,920,060 B2 * | 4/2011 | Saito | ............................. | 340/540 |
| 7,941,161 B2 * | 5/2011 | Ioppe et al. | ................ | 455/456.3 |
| 7,941,162 B2 * | 5/2011 | Ioppe et al. | ................ | 455/456.3 |

(Continued)

FOREIGN PATENT DOCUMENTS

EP 2325822 A1 5/2011
WO 2004016030 A1 2/2004

OTHER PUBLICATIONS

Response to Search Report from corresponding European patent application No. 12179142.0, dated Dec. 4, 2012, filed Aug. 1, 2013, 7 pp.

(Continued)

*Primary Examiner* — Ranodhi Serrao
(74) *Attorney, Agent, or Firm* — Shumaker & Sieffert, P.A.

(57) ABSTRACT

A disaster response system receives location data and status data from participating devices in an area affected by a disaster. The disaster response system provides data to client devices outside the affected area. The data indicate statuses of people within the affected area. Disaster response system also instructs routers to perform actions to adjust bandwidth available for a particular use during and after the disaster.

16 Claims, 17 Drawing Sheets

(56) References Cited

U.S. PATENT DOCUMENTS

| | | | |
|---|---|---|---|
| 8,200,248 B2* | 6/2012 | Ioppe et al. | 455/456.3 |
| 8,204,514 B2* | 6/2012 | Ioppe et al. | 455/456.3 |
| 8,219,110 B1* | 7/2012 | White et al. | 455/456.1 |
| 8,224,284 B2* | 7/2012 | Foladare et al. | 455/404.1 |
| 2002/0068584 A1* | 6/2002 | Gage et al. | 455/456 |
| 2002/0171581 A1* | 11/2002 | Sheynblat et al. | 342/357.09 |
| 2003/0028621 A1* | 2/2003 | Furlong et al. | 709/219 |
| 2003/0162557 A1* | 8/2003 | Shida | 455/521 |
| 2003/0197615 A1* | 10/2003 | Roche et al. | 340/573.1 |
| 2004/0103158 A1* | 5/2004 | Vella et al. | 709/206 |
| 2005/0159142 A1* | 7/2005 | Giniger et al. | 455/414.3 |
| 2006/0040639 A1* | 2/2006 | Karl et al. | 455/404.1 |
| 2006/0044407 A1* | 3/2006 | Barbeau | 348/211.3 |
| 2006/0049934 A1* | 3/2006 | Breen | 340/531 |
| 2006/0079200 A1* | 4/2006 | Hirouchi et al. | 455/404.1 |
| 2006/0223494 A1* | 10/2006 | Chmaytelli et al. | 455/404.2 |
| 2006/0273893 A1* | 12/2006 | Warner | 340/531 |
| 2007/0064882 A1* | 3/2007 | Ger et al. | 379/33 |
| 2007/0202927 A1* | 8/2007 | Pfleging et al. | 455/567 |
| 2007/0210910 A1* | 9/2007 | Norstrom et al. | 340/506 |
| 2008/0028651 A1* | 2/2008 | Katz et al. | 40/599 |

OTHER PUBLICATIONS

Search Report from European patent application No. 12179142.0, dated Dec. 4, 2012, 7 pp.

* cited by examiner

DISASTER RESPONSE SYSTEM

TECHNICAL FIELD

The invention relates to systems for responding to disasters.

BACKGROUND

Mobile devices have become increasingly common communication tools. In some instances, mobile devices have become so common that mobile devices can be treated as personal identities. During and after a disaster many people attempt to use their mobile devices to communicate with other people. For example, ordinary people in an area affected by a disaster may attempt to use their mobile devices to communicate with family, friends, and emergency response personnel. Moreover, emergency response personnel use mobile devices to coordinate their activities. In addition, people outside the affected area may attempt to call people believed to be in the affected area.

The communication infrastructure in an area affected by a disaster may become overloaded because many people within the affected area attempt to use their mobile devices to communicate with others during and after the disaster. As a result, people in the affected area may be unable to make phone calls, send or receive text messages, or transmit data on their mobile devices. Furthermore, people outside the affected area may be unable to make phone calls, send text messages, or transmit data to the mobile devices of people within the affected area. In addition, the ability of emergency response personnel to communicate with each other to coordinate their actions may be reduced.

SUMMARY

A mobile disaster warning system is described that utilizes two-way communication protocols for distributing information to and collecting information from participating devices in the event of a natural disasters or other event that may significantly put at risk human life in one or more geographic regions. For example, the disaster warning system may include one or more coordination data centers in communication with disaster-sensitive network infrastructure, such as routers or switches. In response to detection of a natural disaster or other event, application servers of the coordination data center may interact with the disaster-sensitive network infrastructure to adjust system bandwidth available for various uses during and after a disaster. Techniques are also described by which the coordination data centers efficiently receive location data and status data from participating devices in geographic areas affected by a disaster. The location data indicates the specific locations of the participating devices while the status data indicates whether users of the participating devices need emergency assistance. The coordination data center provides interfaces to client devices outside the affected area by which other users are able to quickly and easily determine the status of particular users. This may allow emergency responders to determine whether particular users of the participating devices need emergency assistance, and may allow friends and family to quickly determine the status of an individual. By using such interfaces, it may be unnecessary for voice or data communication to be made between people inside the affected area and people outside the affected area to communicate the status of the people within the affected area. By potentially reducing the amount of voice and data communication occurring within the affected area to communicate statuses of individuals, the bandwidth available for other uses may increase. For instance, the bandwidth available for use by emergency response personnel may increase.

In one embodiment, techniques of this disclosure provide a method for adjusting system bandwidth available for a particular use during and after a disaster. The method comprises receiving a disaster alert message at a participating device. In addition, the method comprises in response to receiving the disaster alert message, sending location data to a server automatically. The location data indicates a geographical location of the participating device. Furthermore, the method comprises receiving a post-disaster message at the participating device after the disaster has stopped actively affecting an area that includes the current geographical location of the participating device. The method also comprises in response to the post-disaster message, sending new location data to the server. The new location data indicates a new geographical location of the participating device. In addition, the method comprises in response to the post-disaster message, sending status data to the server. The status data indicates whether a user of the participating device needs emergency assistance.

In another embodiment, technique of this disclosure provide a computing device that comprises circuitry configured to send location data to a server automatically in response to receiving a disaster alert message. The location data indicates a geographical location of the computing device. The computing device further comprises circuitry configured to send new location data to the server in response to receiving a post-disaster message after a disaster has stopped actively affecting an area. The new location data indicates a new geographical location of the computing device. The computing device further comprises circuitry configured to send status data to the server in response to the post-disaster message. The status data indicates whether a user of the computing device needs emergency assistance.

In another embodiment, techniques of this disclosure provide a computer-readable storage medium comprising program instructions to cause a processor to send location data to a server automatically in response to receiving a disaster alert message. The location data indicates a geographical location of the participating device. The program instructions also cause the processor to send new location data to the server in response to receiving a post-disaster message after a disaster has stopped actively affecting an area. The new location data indicates a new geographical location of the participating device. In addition, the program instructions cause the processor to send status data to the server in response to the post-disaster message. The status data indicates whether a user of the participating device needs emergency assistance.

In another embodiment, techniques of this disclosure provide a method for adjusting bandwidth available for a particular use during and after a disaster. The method comprises receiving a disaster profile at a router. In addition, the method comprises after receiving the disaster profile, receiving a reconfiguration message at the router. The reconfiguration message indicates an occurrence of the disaster in a given area. Furthermore, the method comprises adjusting the bandwidth available for a particular use during and after the disaster by modifying a routing information base (RIB) based on data stored in the disaster profile.

In another embodiment, techniques of this disclosure provide router comprising a computer storage medium that stores a disaster profile received by the router. The router also comprises circuitry that, after receiving a reconfiguration message, modifies data in a routing information base (RIB) based on data stored in the disaster profile to adjust the bandwidth available for a particular use during and after the disaster, the reconfiguration message indicating an occurrence of a disaster in a given area.

In another embodiment, techniques of this disclosure provide a method for adjusting bandwidth available for a particular use during and after a disaster. The method comprises sending a disaster alert message to a participating device in an area affected by a disaster. The method also comprises receiving a first location message from the participating device after sending the disaster alert message. The first location message indicates a location of the participating device. In addition, the method comprises sending a post-disaster message to the participating device after sending the disaster alert message to the participating device. Furthermore, the method comprises receiving new location data and status data from the participating device after sending the post-disaster message. The new location data indicates a new location of the participating device. The status data indicates whether a user of the participating device needs emergency assistance. The method also comprises providing an interface to a user outside the area affected by the disaster. The interface contains data indicating whether the user of the participating device needs emergency assistance.

In another embodiment, techniques of this disclosure provide a computing device comprising a processing system configured to send a disaster alert message to a participating device in an area affected by a disaster. The processing system is further configured to receive a first location message from the participating device after sending the disaster alert message, the first location message indicating a location of the participating device. In addition, the processing system is configured to send a post-disaster message to the participating device after sending the disaster alert message to the participating device. Furthermore, the processing system is configured to receive new location data and status data from the participating device after sending the post-disaster message. The new location data indicates a new location of the participating device. The status data indicates whether a user of the participating device needs emergency assistance. The processing system is also configured to provide an interface to a user outside the area affected by the disaster. The interface contains data indicating whether the user of the participating device needs emergency assistance.

In another embodiment, techniques of this disclosure provide a computer-readable storage medium comprising program instructions to cause a processor to send a disaster alert message to a participating device in an area affected by a disaster. The program instructions also cause the processor to store data indicating a location of the participating device after sending the disaster alert message. A first location message received by the computing device indicating a location of the participating device. The program instructions also cause the processor to send a post-disaster message to the participating device after sending the disaster alert message to the participating device. In addition, the program instructions cause the processor to store new location data and status data received from the participating device after sending the post-disaster message. The new location data indicates a new location of the participating device. The status data indicates whether a user of the participating device needs emergency assistance. The program instructions also cause the processor to provide an interface to a user outside the area affected by the disaster, the interface containing data indicating whether the user of the participating device needs emergency assistance.

In another embodiment, techniques of this disclosure provide a system comprising a plurality of participating devices, a plurality of client devices, and a coordination data center. The coordination data center comprises a processing system configured to execute instructions. Execution of the instructions by the processing system causes the coordination data center to send disaster alert messages to applicable participating devices. The applicable participating devices are ones of the participating devices that are in an area affected by a disaster. The client devices are outside the area. Execution of the instructions further causes the coordination data center to store initial location data for the applicable participating devices. The initial location data indicates locations of the applicable participating devices. The initial location data is based on data received from the applicable participating devices after the coordination data center sends the disaster alert messages. Execution of the instructions further causes the coordination data center to send post-disaster messages to the applicable participating devices after sending the disaster alert messages. Execution of the instructions also causes the coordination data center to store new location data and status data. The new location data indicates new locations of the applicable participating devices. The status data indicates whether users of the applicable participating devices need emergency assistance. The new location data and the status data are based on data received from the applicable participating devices after the coordination data center sends the post-disaster messages. Execution of the instructions further causes the coordination data center to provide to the client devices data indicating whether the users of the applicable participating devices need emergency assistance.

The details of one or more embodiments of the invention are set forth in the accompanying drawings and the description below. Other features, objects, and advantages of the invention will be apparent from the description and drawings, and from the claims.

DETAILED DESCRIPTION

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Furthermore, stacked elements in the attached drawings indicate the presence of one or more similar elements. Alphabetical suffixes on reference numbers for similar elements are not intended to indicate the presence of particular numbers of the elements. In this disclosure, elements having names that start with ordinal words (e.g., "first," "second," "third," and so) do not necessarily imply that the elements have a particular order. Rather, such ordinal words are merely used to refer to different elements of a same or similar type.

Figure 1:
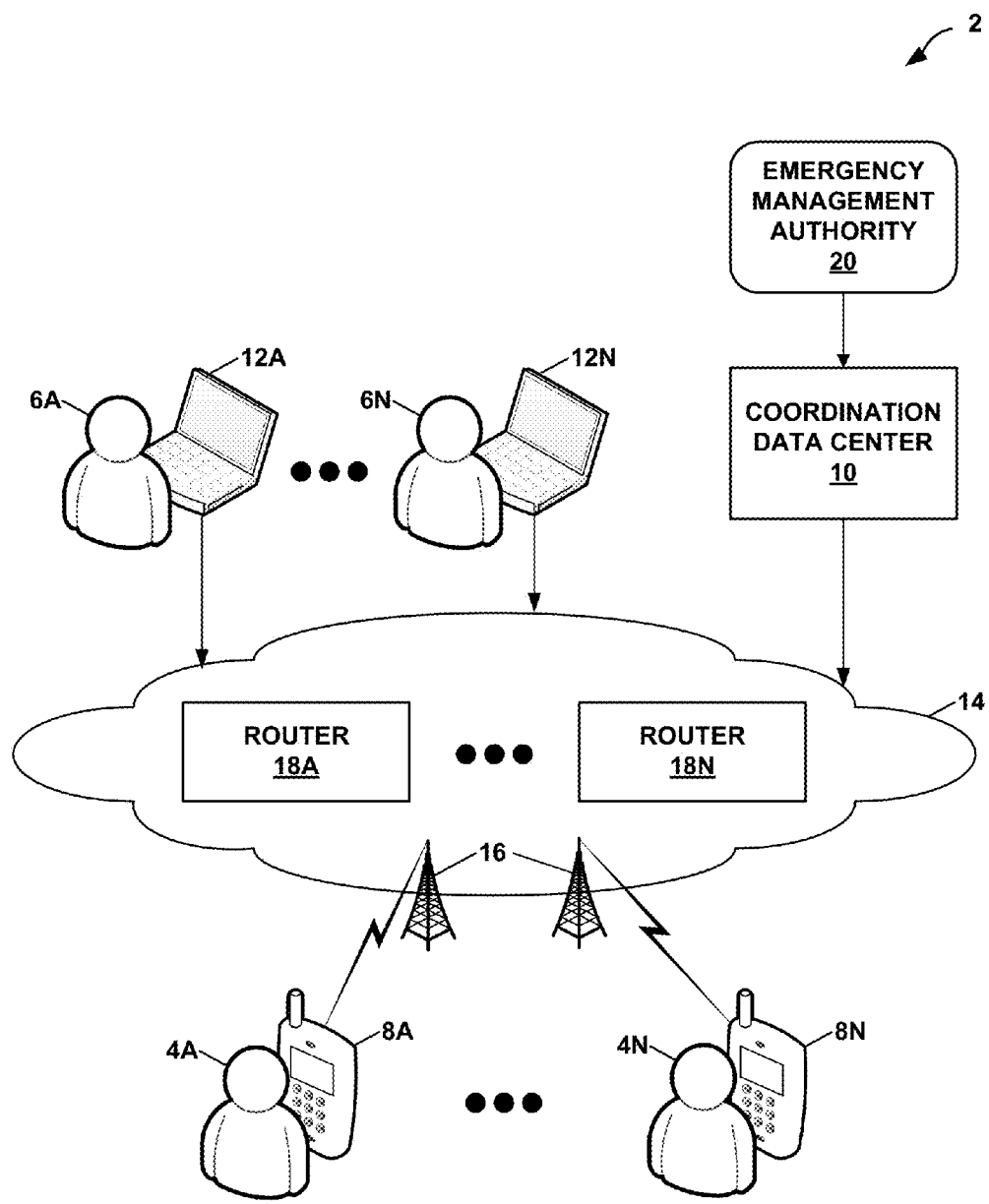
FIG. 1 is a block diagram illustrating an example network environment that includes a disaster warning system.

FIG. 1 is a block diagram illustrating an example network environment that includes a disaster warning system 2. Disaster warning system 2 may warn users 4A-4N (collectively, "users 4") of an approaching disaster and advises users 4 how to avoid the disaster. In addition, disaster warning system 2 may collect information from users 4 after the disaster has affected an area. Disaster warning system 2 may use the collected data to help users 6A-6N (collectively, "users 6"), such as rescue crews, respond to the disaster or may help other users 6, such as friends and family, quickly determine the status of users 4 without risking overloading network infrastructure associated with the affected region.

In the example of FIG. 1, the disaster warning system 2 includes a set of participating devices 8A-8N (collectively, "participating devices 8"), a coordination data center 10, a set of client devices 12A-12N (collectively, "client devices 8"), and a network 14. Network 14 facilitates communication among participating devices 8, coordination data center 10, and client devices 12.

Participating devices 8 enable users 4 to communicate with other computing devices via network 14. Each of participating devices 8 comprises one or more computing devices. In various examples, participating devices 8 comprise various types of computing devices. For example, participating devices 8 can comprise mobile devices, such as mobile telephones, smartphones, tablet computers, laptop computers, netbook computers, and other types of computing devices that enable their users to communicate with one or more other computing devices. In other examples, one or more of participating devices 8 can comprise types of computing devices other than mobile computing devices, such as personal computers. Although the example of FIG. 1 shows participating devices 8 as mobile telephones, readers will understand that participating devices 8 can comprise one or more other types of computing devices.

Participating devices 8 are able to communicate with other computing devices on network 14 wirelessly. That is, each of participating devices 8 comprises a radio transmitter that sends wireless signals received by base stations 16. Base stations 16 transmit data represented by the wireless signals onto network 14 for delivery to destination devices. Furthermore, each of participating devices 8 comprises a radio receiver that receives wireless signals transmitted by base stations 16. The wireless signals transmitted by base stations 16 represent data sent by source devices on network 14 to participating devices 8.

Coordination data center 10 may be provided by a data center having redundant computing devices coupled by a high-speed switch fabric and other devices. As another example, coordination data center 10 may represent one or more personal computers, standalone server devices, blade server devices, and/or other types of computing devices.

Client devices 12 enable users 6 to communicate with other computing devices via network 14. Each of client devices 12 comprises one or more computing devices. In various examples, client devices 12 can comprise various types of computing devices. For example, client devices 12 can comprise mobile telephones, smartphones, tablet computers, laptop computers, desktop computers, netbook computers, thin-client computers, mainframe computers, in-car computers, network appliances, and other types of computing devices that enable users 6 to communicate with other computing devices via network 14. Although the example of FIG. 1 shows client devices 12 as being laptop computers, readers will understand that client devices 12 can comprise one or more other types of computing devices.

Various examples of network 14 facilitate communication among participating devices 8, coordination data center 10, and client devices 12 in various ways. For example, various examples of network 14 include various types of network. In this example, network 14 can include one or more local area networks, campus area networks, wide area networks, telephone communication networks, and/or other types of networks. Some examples of network 14 include the Internet. In another example, various examples of network 14 include various types of intermediate network devices. In this example, network 14 can include one or more routers, switches, hubs, bridges, firewall devices, and other types of intermediate network devices. The example of FIG. 1 illustrates that network 14 comprises a set of routers 18A-18N (collectively, "routers 18"). Each of routers 18 comprises one or more computing devices that route data through network 14.

Coordination data center 10 receives input from an emergency management authority 20. The input indicates that a disaster has struck or is about to strike a given area, such as a city, part of a city, county, or region. For example, the input can indicate that an earthquake has struck a particular city or region. In another example, the input can indicate that a tornado is moving through a particular county. In yet another example, the input can indicate that a terrorist attack has struck a particular part of a city. Other example types of disasters can include tsunami, hurricane, storm surge, flood, volcanic eruption, nuclear meltdown, chemical, biological or nuclear weapons attack, wildfire, school shooting, or other types of events that in which the lives of many people are threatened.

In various examples, emergency management authority 20 includes various types of governmental or non-governmental authorities. For example, in the United States, emergency management authority 20 can be the National Weather Service, the United States Department of Homeland Security, the United States Geological Survey, the National Hurricane Center, law enforcement agencies, the National Forest Service, or another authority that is able to indicate whether a disaster has struck or is about to strike an area.

When coordination data center 10 receives the input from emergency management authority 20 indicating that a disaster has affected or is about to affect a given area, coordination data center 10 sends disaster alert messages to participating devices 8 in the given area. In various embodiments, participating devices 8 perform various actions in response to the disaster alert messages. For example, participating devices 8 can alert users 4 regarding the disaster. Furthermore, in this example, participating device 8 can inform users 4 how to best avoid harm from the disaster. In another example, participating devices 8 can send location data to coordination data center 10. The location data sent by participating devices 8 indicate locations of participating devices 8.

When coordination data center 10 receives the input from emergency management authority 20 indicating that a disaster has struck or is about to strike a given area, coordination data center 10 may send reconfiguration messages to one or more routers 18 in network 14. In various examples, routers 18 perform various actions in response to receiving the router reconfiguration messages. For example, routers 18 can prioritize the transmission of certain types of communications through network 14. For instance, routers 18 can prioritize communications sent and received by emergency response personnel, such as ambulance crews, firefighters, law enforcement officers, and so on. In another example, routers 18 can prioritize the transmission of messages sent from or to communication devices in the area affected by the disaster. In yet another example, routers 18 can reroute the transmission of data through network 14 such that traffic not destined for communication devices in the disaster area is not routed through parts of network 14 that are in the affected area.

Coordination data center 10 may also receive post-disaster input from emergency management authority 20. In some examples, the post-disaster input indicates that immediate danger from a disaster has passed or that the disaster has stopped actively affecting an area. For example, coordination data center 10 can receive post-disaster input from emergency management authority 20 indicating that a hurricane has moved out of a given area. When coordination data center 10 receives post-disaster input, coordination data center 10 sends post-disaster messages to participating devices 8 in the affected area.

In various examples, participating devices 8 respond to the post-disaster messages in various ways. For example, participating devices 8 can respond to the post-disaster messages by prompting users 4 to indicate whether users 4 need emergency assistance. Emergency assistance can include medical assistance, firefighting assistance, law enforcement assistance, and/or other types of assistance needed urgently in the wake of a disaster. In this example, participating devices 8 provide status messages to coordination data center 10. The status messages indicate whether users 4 need emergency assistance. In another example, participating devices 8 can respond to the post-disaster messages by sending location data to coordination data center 10. The location data sent by participating devices 8 indicates new locations of participating devices 8.

Coordination data center 10 provides a status data and location data for users 4 to client devices 12. For example, coordination data center 10 can provide data indicating that user 4A is near 436 Canyon Road and does not need emergency assistance. In various examples, users 6 use the status data and location data for various purposes. For example, users 6 can use the status data and location data to learn locations of their friends or family are whether their friends or family need emergency assistance. In another example, users 6 can use the status data and location data to coordinate a response to the disaster. For instance, users 6 can use the status data and location data to send emergency response resources to areas having the greatest concentration of people needing assistance. In some instances, users 6 include emergency response personnel.

Figure 2:
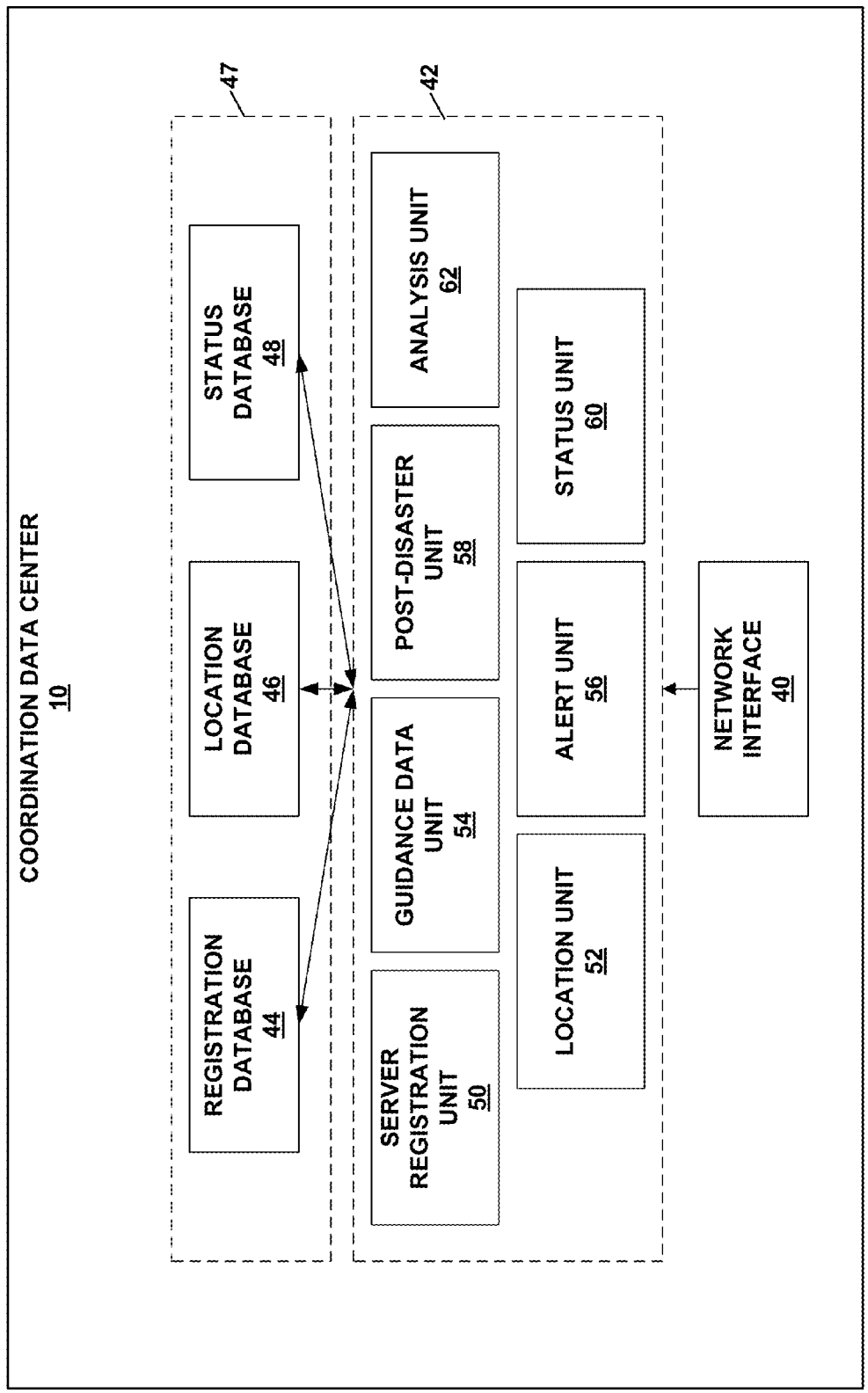
FIG. 2 is a block diagram illustrating an example configuration of a coordination data center.

FIG. 2 is a block diagram illustrating a simplified arrangement of a coordination data center 10. In the illustrated example of FIG. 2, coordination data center 10 is represented in a three tier arrangement having a network interface 40, a set of message processing units 42 executing on application servers, and a registration database 44, a location database 46, and a status database 48 maintained by one or more database servers 47. Although not shown, coordination data center may include high-speed switching components to interconnect network interface 40, the application servers and database servers 47.

Network interface 40 provides front-end interface for receiving messages from and sending messages two network 14. For example, network interface may include one or more web servers for presenting web-based interface for remote access, such as via users 6. In addition, network interface may communicate directly with mobile devices 4 via one or more communication protocols. Network interface 40 may interact with message processing units 42 to process certain types of messages received from network 14. In the example of FIG. 2, message processing units 42 include a server registration unit 50, a location unit 52, a guidance data unit 54, an alert unit 56, a post-disaster unit 58, a status unit 60, and an analysis unit 62. Other examples include more, fewer, or different message processing units.

As described in detail elsewhere in this disclosure, server registration unit 50 processes registration messages received by network interface 40. Location unit 52 processes location messages received by network interface 40. Guidance data unit 54 processes guidance request messages received by network interface 40. Alert unit 56 processes disaster input messages received by network interface 40. Post-disaster unit 58 processes post-disaster input messages received by network interface 40. Status unit 60 processes status messages received by network interface 40. Analysis unit 62 processes analysis request messages received by network interface 40.

In various examples, coordination data center 10 implements network interface 40 and message processing units 42 in various ways. For example, execution of instructions by circuitry, such as a processing system, in a computing device can cause the computing device to provide network interface 40 and one or more of message processing units 42. In another example, a computing device can comprise one or more application-specific integrated circuits (ASICs) that operate to provide network interface 40 and/or message processing units 42.

In various examples, coordination data center 10 implements registration database 44, location database 46, and status database 48 in various ways. For example, registration database 44, location database 46, and status database 48 can be implemented as one or more types of databases. In this example, registration database 44, location database 46, and status database 48 can be implemented as one or more relational databases, files, directories, XML documents, or other types of data structures for storage and retrieval of data. In some examples, registration database 44, location database 46, and status database 48 are implemented as parts of a single database.

Figure 3:
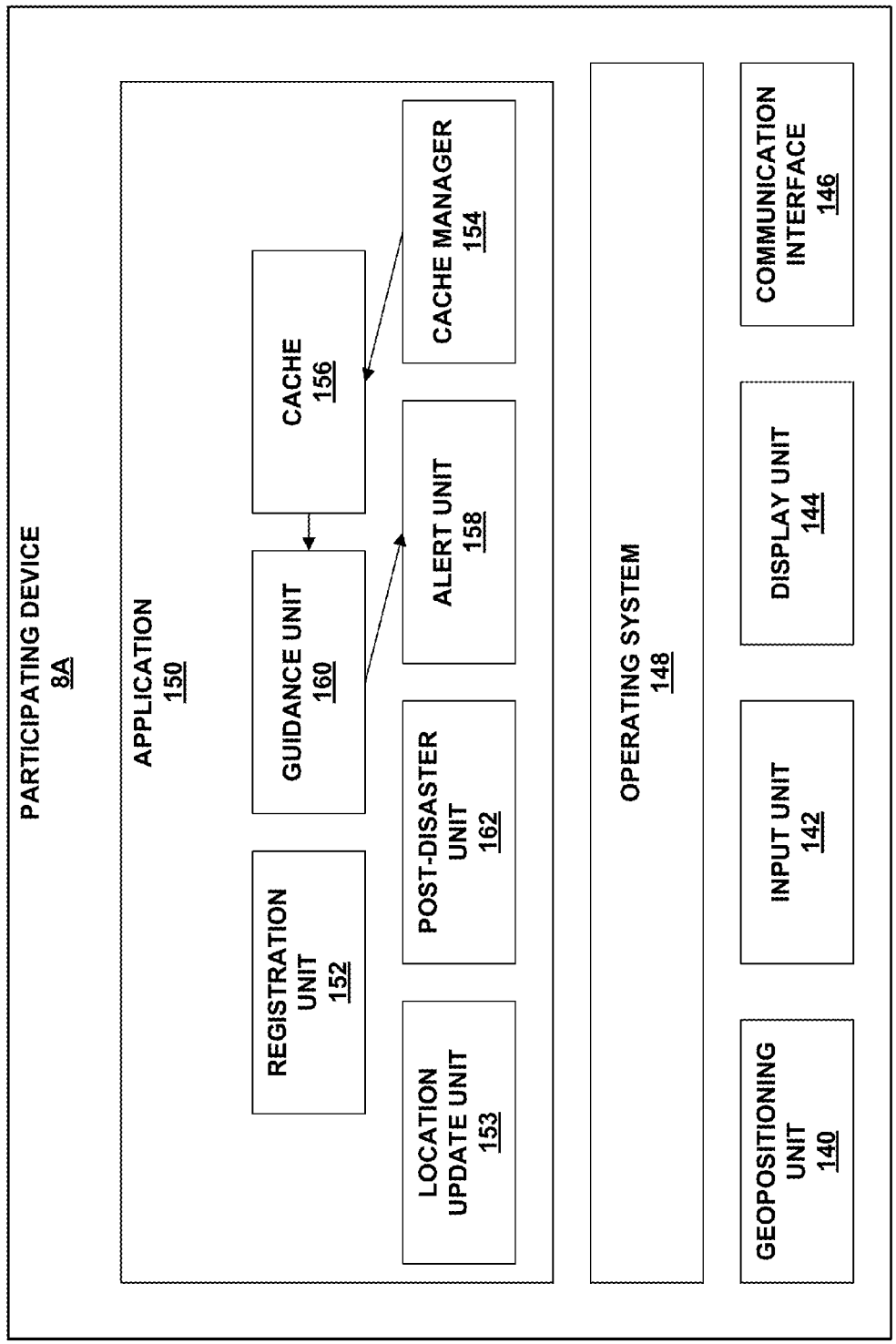
FIG. 3 is a block diagram illustrating an example configuration of a participating device.

FIG. 3 is a block diagram illustrating an example configuration of a participating device 8A. Although the example of FIG. 3 illustrates an example configuration of participating device 8A, readers will understand that other ones of participating devices 8 can have similar configurations. Moreover, readers will understand that other ones of participating devices 8 can have different configurations than the configuration of participating device 8A illustrated in the example of FIG. 3.

In the example of FIG. 3, participating device 8A implements a geopositioning unit 140, an input unit 142, a display unit 144, a communication interface 146, an operating system 148, and an application 150. The geopositioning unit 140 provides location data that indicates a geographical location of participating device 8A. Input unit 142 receives input from user 4A. Display unit 144 displays data to user 4A. Communication interface 146 sends data to and receives data from network 14 wirelessly. Operating system 148 manages resources of participating device 8A. Application 150 runs on participating device 8A and provides disaster alert functionality. In some examples, application 150 runs in the background of participating device 8A and does not request the attention of user 4A until participating device 8A receives a message from coordination data center 10. Moreover, although shown separately, all or portions of application 150 may be integrated within operating system 148.

Application 150 comprises a registration unit 152, a location update unit 153, a cache manager 154, a cache 156, an alert unit 158, a guidance unit 160, and a post-disaster unit 162. In some examples, application 150 includes more, fewer, or different units. When communication interface 146 receives a message for application 150, operating system 148 provides the message to application 150. When application 150 utilizes geopositioning unit 140, input unit 142, display unit 144, or communication interface 146, application 150 provides requests to operating system 148. Operating system 148 then interacts with geopositioning unit 140, input unit 142, display unit 144, or communication unit 146 to fulfill the requests.

When application 150 is running, registration unit 152 registers information about user 4A with coordination data center 10. In this way, coordination data center 10 may have access to information that may be used in the prior to or during the aftermath of a natural disaster or other event. Location update unit 153 repeatedly sends information indicating the location of participating device 8A to coordination data center 10. In this way, coordination data center 10 is able to store data indicating the current location of participating device 8A. In some examples, alert unit 56 uses this data to determine whether participating device 8A is in an area potentially affected by a disaster.

Prior to participating device 8A receiving a disaster alert message, cache manager 154 downloads guidance data to participating device 8A. Cache manager 154 caches the guidance data in cache 156. In some examples, the guidance data provides information about locations for user 4A to go to when a disaster is approaching. As participating device 8A moves to different areas, cache manager 154 can download different guidance data.

When communication interface 146 receives a disaster alert message from communication server 10, communication interface 146 provides the disaster alert message to alert unit 158. Alert unit 158 then generate response instructions. The response instructions indicate how user 4A may respond to the disaster. Guidance data stored in cache 156 can be used to generate the response instructions. In some examples, alert unit 158 determines whether the disaster alert message is related to a disaster that can be avoided by moving to another location. If so, alert unit 158 instructs guidance unit 160 to calculate a route to a safe location. In such examples, the response instructions can include the calculated route.

Furthermore, alert unit 158 generates a disaster alert interface when alert unit 158 receives a disaster alert message. Alert unit 158 instructs operating system 148 to display the disaster alert interface on display unit 144. The disaster alert interface displays the information about a disaster affecting the location of participating device 8A and the response instructions.

When alert unit 158 receives a disaster alert message, alert unit 158 sends a request to geopositioning unit 140 to provide location data to alert unit 158. The location data indicates a geographical location of participating device 8A. Alert unit 158 then generates a location message based on the location data. The location message specifies the location of participating device 8A. Alert unit 158 then sends the location message to coordination data center 10. In this way, coordination data center 10 can store data indicating a location of participating device 8A at the time coordination data center 10 sent the disaster alert message, (e.g., prior to the disaster striking an area.)

When communication interface 146 receives a post-disaster message, post-disaster unit 162 performs a post-disaster operation. In various examples, post-disaster unit 162 performs various post-disaster operations. For example, post-disaster unit 162 can perform a post-disaster operation in which post-disaster unit 162 obtains location data from geopositioning unit 140. In this example, post-disaster system generates a location message based on the location data. The location message specifies the location of participating device 8A. Post-disaster unit 162 then sends the location message to coordination data center 10. In this way, coordination data center 10 can store data indicating the location of participating device 8A after a disaster has struck an area.

Furthermore, in some post-disaster operations, post-disaster unit 162 generates a status interface. The status interface prompts user 4A to indicate whether user 4A needs emergency assistance. Post-disaster unit 162 then instructs operating system 148 to display the status interface on display unit 144. Subsequently, input unit 142 can receive input from user 4A indicating whether user 4A needs emergency attention. When input unit 142 receives the input, post-disaster unit 162 generates a status message that indicates whether user 4A needs emergency assistance. Post-disaster unit 162 then instructs operating system 148 to send the status message to coordination data center 10. Operating system 148 uses communication interface 148 to send the status message to coordination data center 10.

Figure 4:
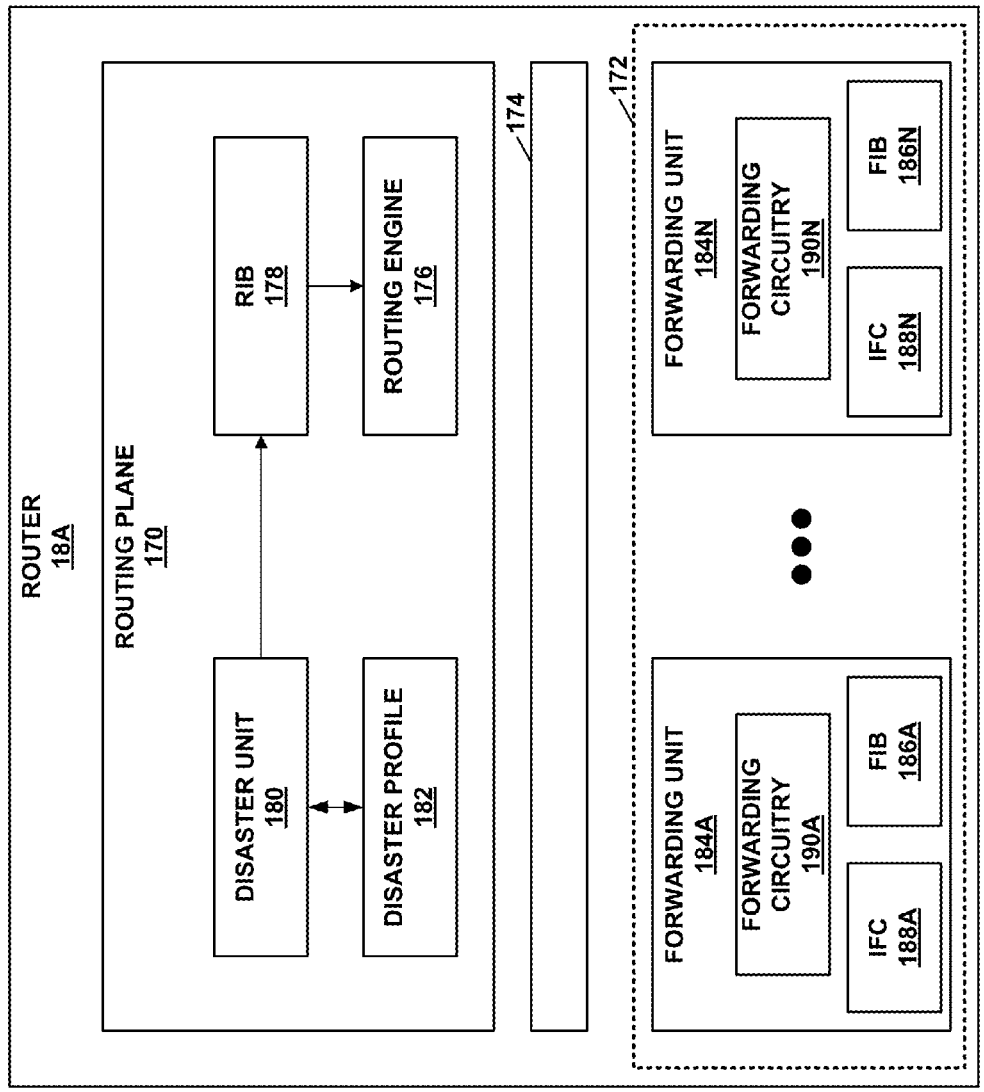
FIG. 4 is a block diagram illustrating an example configuration of a router.

FIG. 4 is a block diagram that illustrates an example configuration of router 18A. Although the example of FIG. 4 illustrates an example configuration of router 18A, readers will understand that other ones of routers 18 can have similar configurations. Moreover, readers will understand that other ones of routers 18 can have configurations different than the configuration of router 18A illustrated in the example of FIG. 4.

In the example configuration shown in FIG. 4, router 18A comprises a routing plane 170, a forwarding plane 172, and communication system 174. Routing plane 170 provides a routing engine 176, a routing information base (RIB) 178, a disaster unit 180, and a disaster profile 182. Forwarding plane 172 comprises a set of forwarding units 184A-184N (collectively, "forwarding units 184"). Forwarding units 184A-184N respectively comprise forwarding information bases (FIBs) 186A-186N (collectively, "FIBs 186"), interface cards (IFCs) 188A-188N (collectively, "IFCs 188"), and forwarding circuitry 190A-190N (collectively, "forwarding circuitry 190"). Communication system 174 facilitates data transfer between forwarding units 184 and between control plane 172 and forwarding units 184.

Routing engine 176 has primary responsibility for maintaining RIB 178 to reflect the current topology of network 14 and other network entities to which router 18A is connected. For example, routing engine 176 provides an operating environment for execution of protocols that communicate with peer routers and periodically update RIB 178 to accurately reflect the topology of the network and the other network entities. Example protocols include routing and label switching protocols, such as mpBGP, ISIS, RSVP-TE, and LDP. These protocols are usable to establish virtual private networks (VPNs), to establish label-switched paths (LSPs), and to exchange labels. Routing engine 176 typically processes RIB 178 to perform route selection and to generate forwarding rules. FIBs 186 store the forwarding rules generated by routing engine 176.

IFCs 188 in forwarding units 184 receive packets from different network links. When IFCs 188 receive packets, forwarding circuitry 190 uses the forwarding rules in FIBs 186 to identify and perform actions with regard to the packets. For example, forwarding circuitry 190A can use the forwarding rules in FIB 186A to determine that a packet is to be forwarded to a particular one of forwarding units 184. In another example, forwarding circuitry 190A can use the forwarding rules in FIB 186A to determine that a packet is to be dropped. In yet another example, forwarding circuitry 190A can use the forwarding rules in FIB 186A to forward a packet received in IFC 188A to routing plane 170.

As described in detail elsewhere in this disclosure, disaster unit 180 receives reconfiguration messages from coordination data center 10. In response to receiving a reconfiguration message, disaster unit 180 executing within routing plane 170 performs actions that can adjust the bandwidth available for a particular use, such as use by emergency response personnel. For example, disaster unit 180 may use information stored in disaster profile 182 to modify data in RIB 178. Routing engine 176 processes the modified data in RIB 178 to perform route selection again and to regenerate forwarding rules. Routing engine 176 then causes FIBs 186 to store the regenerated forwarding rules. In this way, router 18A can change how router 18A routes packets such that router 18A may, in effect, adjust the bandwidth available for a particular use, such as use by emergency response personnel, during and after the disaster.

In various examples, router 18A implements routing engine 176, RIB 178, disaster unit 180, disaster profile 182, FIBs 186, IFCs 188, and forwarding circuitry 190 in various ways. For example, execution of instructions by circuitry, such as one or more processing systems, can cause router 18A to implement functionality of routing engine 176, and disaster unit 180. In another example, router 18A can comprise one or more ASICs that operate to provide functionality of forwarding circuitry 190, IFCs 188, routing engine 176, and/or disaster unit 180. In some examples, RIB 178 and FIBs 186 are implemented using various types of computer storage media, such as registers, cache memory units, random-access memory units, and/or other types of devices for storage and retrieval of data.

Figure 5:
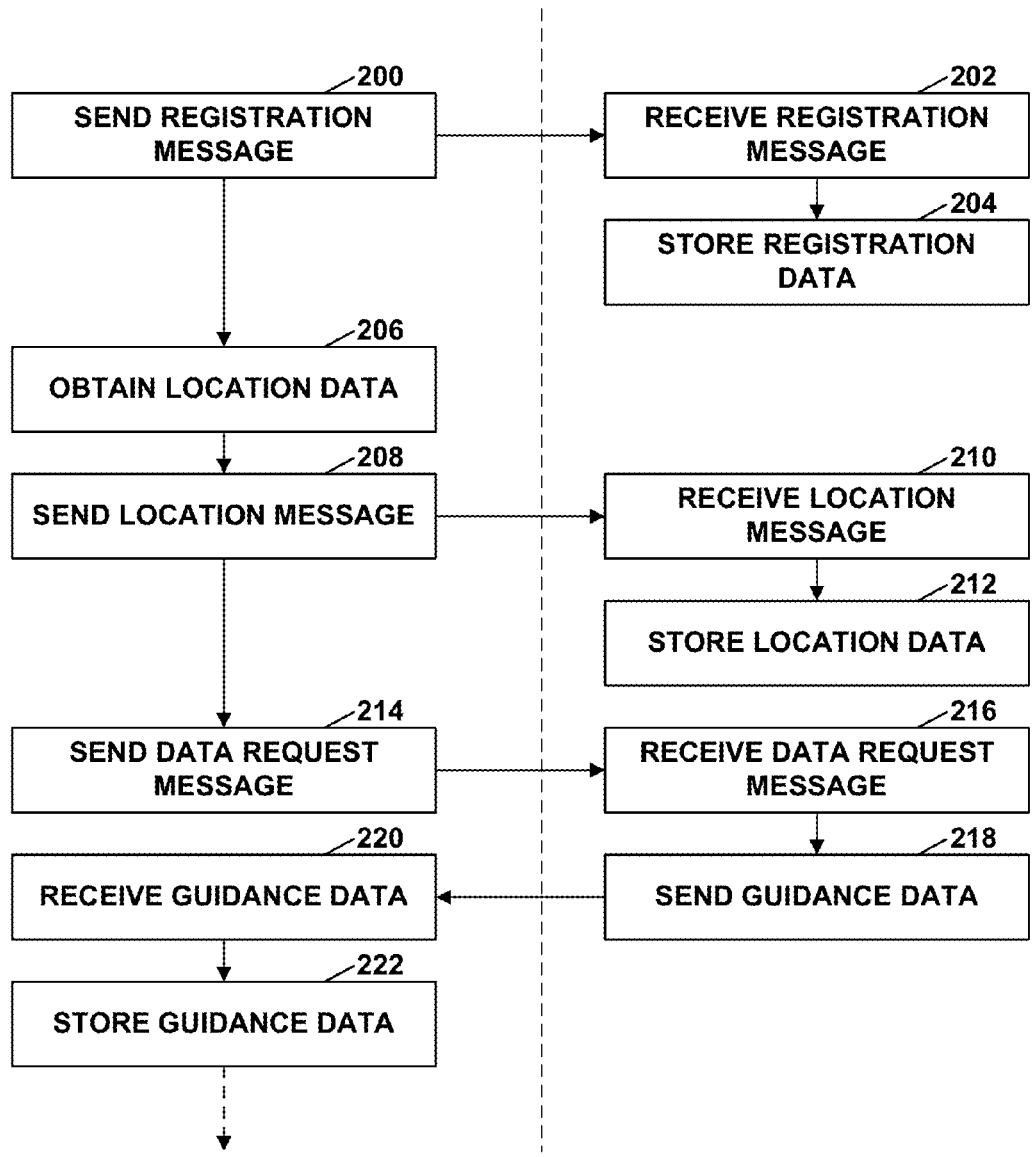
FIG. 5 is a flowchart illustrating an example operation in which the participating device interacts with the coordination data center.

FIG. 5 is a flowchart illustrating an example operation in which participating device 8A interacts with coordination data center 10. Although the example of FIG. 5 illustrates an example operation of participating device 8A, readers will understand that other ones of participating devices 8 can perform similar operations. Moreover, readers will understand that other ones of participating devices 8 can perform different operations.

After the operation starts, registration unit 152 causes communication interface 146 to send a registration message to coordination data center 10 (200). The registration message comprises registration data. In various examples, the registration data includes various types of data. For example, the registration data can include a name, home address, phone number, emergency contact information, medical information such as blood type and allergies, and other information about user 4A.

In various examples, registration unit 152 formats the registration message in various ways. For instance, some examples of registration unit 152 format the registration message as a Hypertext Transfer Protocol HTTP message. Other examples of registration unit 152 format the registration message as a remote procedure call (RPC) protocol message.

After participating device 8A sends the registration message, network interface 40 of coordination data center 10 receives the registration message (202). When network interface 40 receives the registration message, network interface 40 uses server registration unit 50 to store the registration data specified by the registration message in registration database 44. In this way, coordination data center 10 can store information regarding user 4A that may be useful in the aftermath of a disaster.

In various examples, registration unit 152 formats the registration message in various ways. For instance, some examples of registration unit 152 format the registration message as a HTTP message. Other examples of registration unit 152 format the registration message as a RPC message.

After participating device 8A sends the registration message, location update unit 153 obtains location data from geopositioning unit 140 (206). The location data indicates a current location of participating device 8A. In various examples, geopositioning unit 140 determines the current geographical location of participating device 8A in various ways. For example, geopositioning unit 140 can use the Global Positioning System (GPS), the Galileo navigation system, the Glonass navigation system, or another satellite-based navigation system.

Location update unit 153 then causes communication interface 146 to send a location message to coordination data center 10 (208). The location message contains data indicating the current location of participating device 8A. In various examples, the location message specifies the current geographical location of participating device 8A in various ways. For example, the location message can specify the current geographical location of participating device 8A in terms of latitude and longitude. In another example, the location message can specify the current location of participating device 8A as a closest street address to participating device 8A.

In various examples, location update unit 153 sends the location messages to coordination data center 10 in response to various events. For instance, some examples of location update unit 153 send location messages to coordination data center 10 on a periodic basis. Other examples of location update unit 153 send location messages to coordination data center 10 upon detecting that participating device 8A has moved more than a given distance from the location indicated in a location message previously sent by location update unit 153. In some examples, location update unit 153 sends location messages as part of a background process. In other words, location update unit 153 can send location messages without first receiving explicit input from user 4A to do so.

In some examples, location update unit 153 does not send location messages to coordination data center 10 after participating device 8A has received a disaster alert message from the coordination data center 10. Because location update unit 153 does not send location messages to coordination data center 10 after participating device 8A has received a disaster alert message from the coordination data center 10, resources of network 14 are not devoted to forwarding the location messages. In some instances, such resources of network 14 could be better used for other purposes, such as forwarding disaster alert messages and forwarding communication data between emergency response personnel.

In various examples, location update unit 153 formats the location message in various ways. For instance, some examples of location update unit 153 format the location message as a HTTP message. Other examples of location update unit 153 format the location message as a RPC message.

After client 8A sends the location message, coordination data center 10 receives the location message (210). When coordination data center 10 receives the location message, network interface 40 uses location unit 52 to store data indicating the location participating device 8A specified by the location message in location database 46 (212).

Furthermore, in some examples cache manager 154 causes communication interface 146 to periodically send a data request message to coordination data center 10 to receive any impending guidance (214). That is, the data request message requests any recent guidance data from coordination data center 10. In some examples, application 150 combines a registration message, a location message, and/or a data request message into a single message. In various examples, cache manager 154 formats the data request message in various ways. For instance, some examples of cache manager 154 format the data request message as a HTTP message. Other examples of cache manager 154 format the data request message as a RPC message. In various examples, cache manager 154 sends the data request message to coordination data center 10 in response to various events. For instance, some examples of cache manager 154 send data request messages to coordination data center 10 on a periodic basis. Other examples of cache manager 154 send data request messages to coordination data center 10 upon detecting that participating device 8A has moved more than a given distance from the location at which a location message was previously sent by location update unit 153.

After participating device 8A sends the data request message, coordination data center 10 receives the data request message (216). For example, when coordination data center 10 receives the data request message, guidance data unit 54 sends guidance data to participating device 8A based on the particular location information for the device (218). Alternatively, coordination data center 10 may periodically or asynchronously push guidance data to participating device 8A based on the most recent location data received from the mobile device. In various examples, the guidance data includes various types of data. For example, the guidance data can specify the names and locations of places near a location of participating device 8A where people can go to avoid various types of disasters. For instance, in this example, the guidance data can specify the names and locations of nearby fallout shelters where people can go to avoid nuclear fallout. In another example, the guidance data can include road maps, topological maps, and/or other types of maps of an area surrounding participating device 8A. In this example, the guidance data can also include information regarding traffic conditions on the roads, road closures, and other information regarding road conditions.

Cache manager 154 of participating device 8A receives the guidance data sent by coordination data center 10 (220) and stores the guidance data in cache 156 (222). In some examples, cache manager 154 does not send data request messages after participating device 8A has received a disaster alert message from the coordination data center 10. Because cache manager 154 does not send data request messages after participating device 8A has received a disaster alert message from coordination data center 10, resources of network 14 are not devoted to forwarding the data request messages and guidance data. In some instances, such resources of network 14 could be better used for other purposes, such as forwarding disaster alert messages and forwarding communication data between emergency response personnel. In this way, bandwidth available for other uses may be adjusted.

Figure 6:
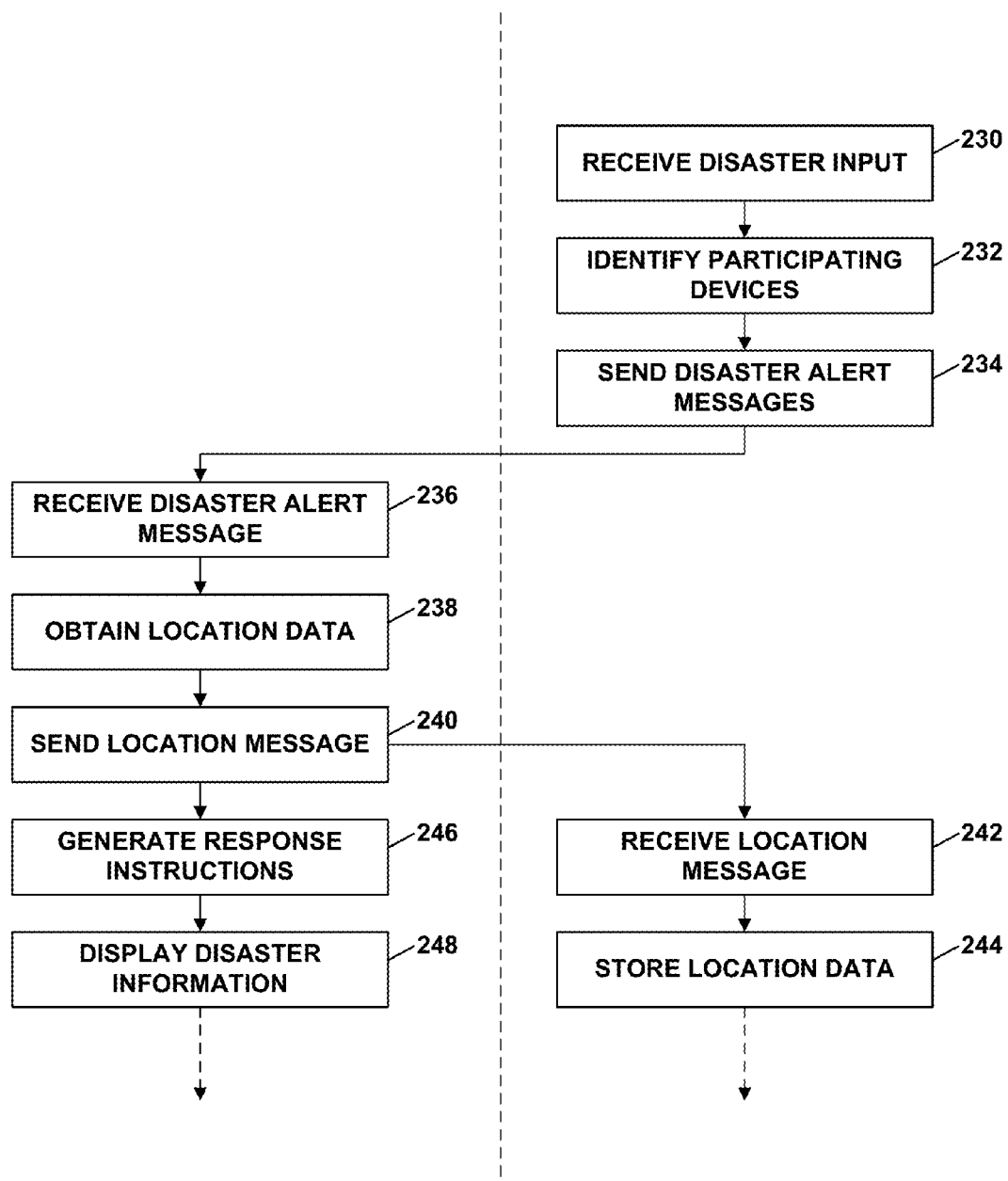
FIG. 6 is a flowchart illustrating a continuation of the example operation of FIG. 5.

The flowchart illustrating the example interaction between client 8A and coordination data center 10 continues in FIG. 6. Subsequently, coordination data center 10 receives disaster input from emergency management authority 20 (230). In various examples, coordination data center 10 receives the disaster input in various ways. For example, coordination data center 10 can provide a secure website for authorized personnel. In this example, employees of emergency management authority 20 can use web browsers running on computing devices to access the website. Web pages in the website include features that the employees can use to provide the disaster input to coordination data center 10. In another example, coordination data center 10 can provide a command line interface. In this example, employees of emergency management authority 20 can provide the disaster input to coordination data center 10 by entering one or more commands into the command line interface.

In various examples, the disaster input includes various types of information. For example, the disaster input can specify a type of disaster (e.g., hurricane, flood, shooting, etc.). In another example, the disaster input can specify details regarding the disaster. In yet another example, the disaster input can identify an area affected by the disaster. In yet another example, the disaster input can identify areas likely to be affected by the disaster in the future.

After coordination data center 10 receives the disaster input from emergency management authority 20, alert unit 56 identifies applicable mobile devices (232). The applicable mobile devices include ones of participating devices 8 that are in an area affected by the disaster or areas likely to be affected by the disaster. In some examples, alert unit 56 uses location data stored in location database 46 to identify applicable mobile devices.

Alert unit 56 then sends disaster alert messages to the applicable participating devices 8 (234). In various examples, alert unit 56 formats the disaster alert messages in various ways. For example, alert unit 56 can format the disaster alert messages as one or more HTTP messages. In another example, alert unit 56 can format the disaster alert messages as one or more SMS text messages.

In various examples, the disaster alert messages comprise various data. For example, the disaster alert messages can comprise data that identifies a type of the disaster. In another example, the disaster alert message can comprise data indicating a direction in which the disaster is moving. In some examples, the amount of data in the disaster alert messages is kept relatively small. In this way, the disaster alert messages contribute less to the load on network 14 during the disaster.

After alert unit 56 sends the disaster alert messages, participating device 8A receives a disaster alert message (236). After participating device 8A receives the disaster alert message, alert unit 158 obtains location data from geopositioning unit 140 (238). The location data specifies a current geographical location of participating device 8A. Alert unit 158 then sends a location message to coordination data center 10 (240). The location message specifies the current geographical location of participating device 8A.

After alert unit 158 sends the location message, coordination data center 10 receives the location message (242). In this way, coordination data center 10 receives data indicating a location of participating device 8A. After coordination data center 10 receives the location message, network interface 40 uses location unit 52 to store data in location database 46 indicating the location of participating device 8A (244). The location data stored by Location unit 52 in location database 46 is based on data specified by the location message. In some examples, alert unit 158 generates and sends the location message automatically, without input from user 4A, in response to receiving the disaster alert message. In this way, coordination data center 10 may be able to store data indicating a location of participating device 8A without user 4A needing to instruct participating device 8A to provide the location data to coordination data center 10.

Furthermore, after alert unit 158 receives the disaster alert message, alert unit 158 generates response instructions (246). The response instructions indicate how user 4A should respond to the disaster. Alert unit 158 generates different types of response instructions for different types of disasters. For example, alert unit 158 can generate response instructions for a tornado that instruct the user 4A to seek shelter in a basement, interior windowless room, or, if user 4A is outside and cannot reach a building, in a ditch or culvert. In another example, alert unit 158 can generate response instructions for a biological weapons attack that instruct user 4A to stay indoors and seal off windows and doors.

In yet other examples, alert unit 158 determines whether the disaster is one that user 4A can escape by moving to a different location. For example, user 4A may be able to escape from a tornado, wildfire, tsunami, lahar, hurricane, typhoon, nuclear fallout, volcanic eruption, or another type of disaster by moving to a different location. In contrast, user 4A may be unable to escape from a terrorist or military attack, school shooting, earthquake, landslide, train derailment, plane crash, shipwreck, or other types of disasters simply by moving to a different location.

In various examples, alert unit 158 determines in various ways whether the disaster is one that user 4A can escape by moving to a different location. For example, some examples of alert unit 158 use information specified by the disaster alert message to determine whether the disaster is one that user 4A can escape by moving to a different location.

If alert unit 158 determines that the disaster is one that user 4A can escape by moving to a different location, guidance unit 160 calculates an escape route. The escape route is a series of instructions that indicate where user 4A should go in order to escape the disaster. For example, the escape route can be a series of turn-by-turn directions that indicate how user 4A should get to a place of safety.

In some examples, the disaster alert message indicates a direction in which the disaster is moving. For example, the disaster alert message can indicate that a wildfire is spreading eastward along a given highway. In another example, the disaster alert message can indicate that a tsunami is headed inland along a certain valley. In yet another example, the disaster alert message can indicate that a flood caused by a dam or levee breach is moving in a given direction. In some examples where the disaster alert message indicates the direction in which the disaster is moving, guidance unit 160 calculates the escape route based on the direction in which the disaster is moving. In this way, guidance unit 160 might not instruct user 4A to go to a location that will be in the path of the disaster.

In some examples, guidance unit 160 uses guidance data stored in cache 156 to generate the response instructions. For example, cache 156 can store instructions for responding to a tornado. In this example, guidance unit 160 generates the response instructions for a tornado based on the instructions stored in cache 156. In another example, cache 156 can store maps. In this example, guidance unit 160 uses the maps to generate an escape route from a current location of participating device 8A to a location where user 4A can escape the disaster. Furthermore, in this example, cache 156 can store data regarding road conditions. In this example, guidance unit 160 can use the road conditions when generating the escape route. In this way, the directions might not guide user 4A onto blocked or congested roads.

After guidance unit 160 generates the response instructions, alert unit 158 causes display unit 144 to display disaster information (248). The disaster information includes the response instructions. In various examples, the disaster information includes various types of information. For example, the disaster information can include a description of the disaster. In another example, if the disaster is one that user 4A can escape by moving to a different location, the disaster information can include turn-by-turn directions for moving to a different location.

Figure 13:
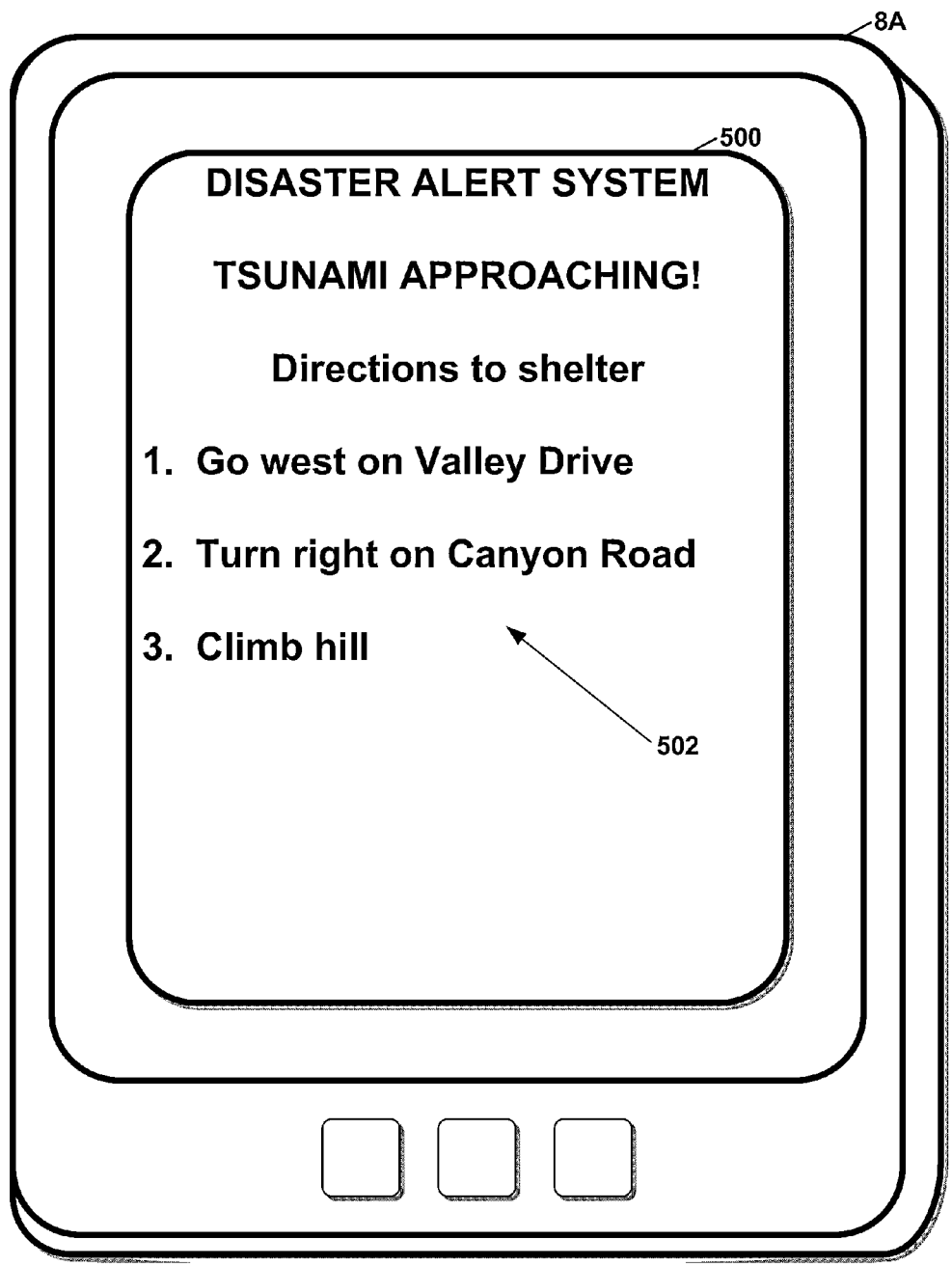
FIG. 13 illustrates an example interface presented by the participating device.

In various examples, alert unit 158 causes display unit 144 to display the disaster information in various ways. For example, alert unit 158 can cause display unit 144 to display various user interfaces that contain the disaster information. FIG. 13, described in detail elsewhere in this disclosure, illustrates an example interface that contains the disaster information.

Figure 7:
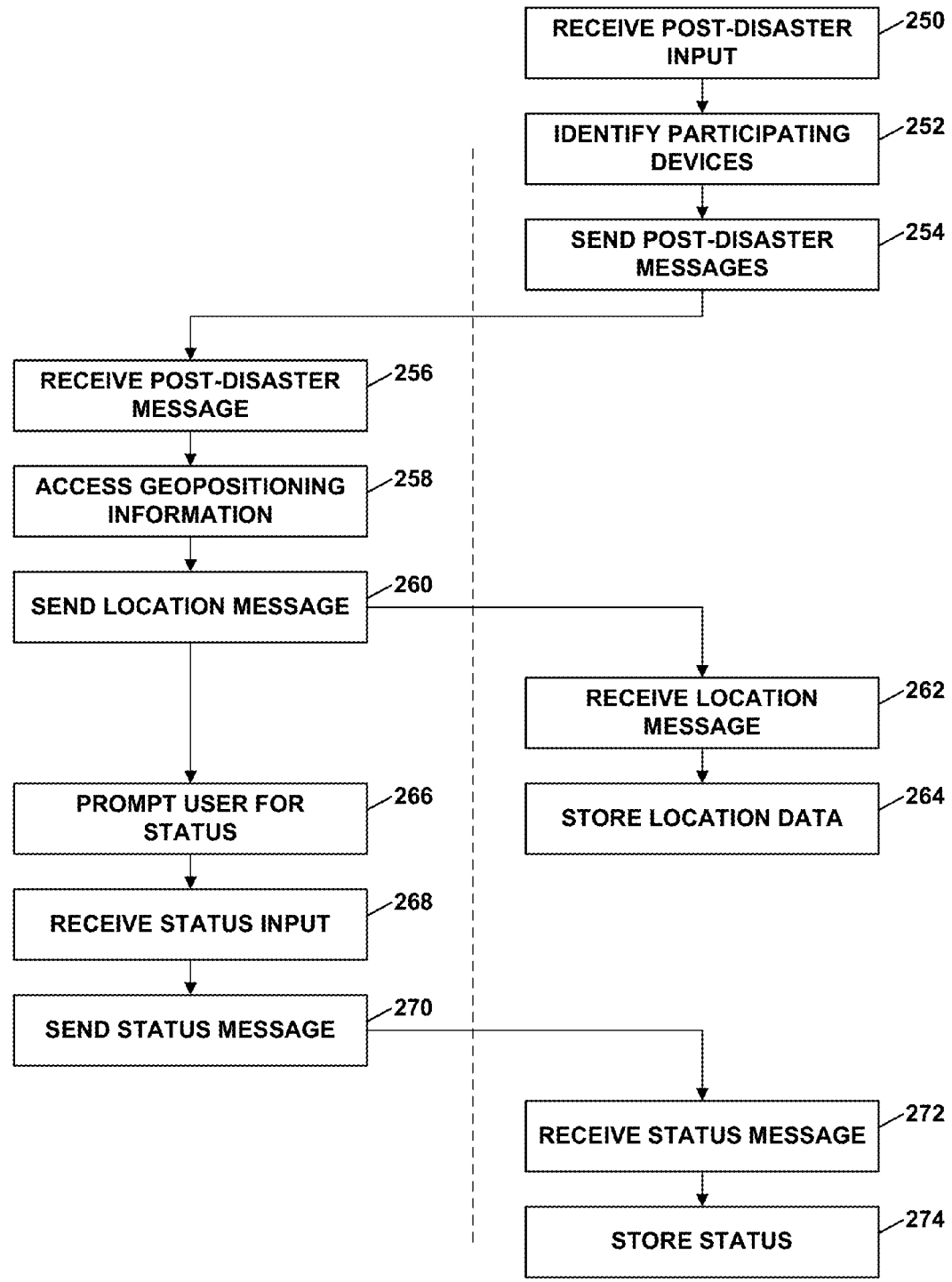
FIG. 7 is a flowchart illustrating a further continuation of the example operation of FIG. 5.

The flowchart illustrating the example interaction between client 8A and coordination data center 10 continues in FIG. 7. After a disaster strikes an area, coordination data center 10 receives post-disaster input from emergency management authority 20 (250). Coordination data center 10 can receive the post-disaster input after the disaster has stopped actively affecting the area. For example, if the disaster is a tornado, coordination data center 10 can receive the post-disaster input after the tornado has dissipated or left the area. In another example, if the disaster is a mass shooting, the coordination data center 10 can receive the post-disaster input after the situation is controlled.

In various examples, coordination data center 10 receives the post-disaster input in various ways. For example, coordination data center 10 can provide a website. In this example, employees of emergency management authority 20 can use web browsers running on computing devices to access the website. Web pages in the website include features that the employees can use to provide the post-disaster input to coordination data center 10. In another example, coordination data center 10 can provide a command line interface. In this example, employees of emergency management authority 20 can provide the post-disaster input to coordination data center 10 by entering one or more commands into the command line interface.

After coordination data center 10 receives the post-disaster input, post-disaster unit 58 identifies applicable mobile devices (252). The applicable mobile devices include ones of participating devices 8 in the affected area. In some examples, post-disaster unit 58 uses data in location database 46 to identify participating device 8 in the area indicated by the post-disaster input. Post-disaster unit 58 then sends post-disaster messages to participating devices 8 in the area indicated by the post-disaster input (254).

Subsequently, client 8A receives one of the post-disaster messages from coordination data center 10 (256). In response to receiving the post-disaster message, post-disaster unit 162 of participating device 8A obtains location data from geopositioning unit 140 (258). Post-disaster unit 162 sends a location message to coordination data center 10 (260). The location message specifies the location data.

After post-disaster unit 162 sends the location message to coordination data center 10, coordination data center 10 receives the location message (262). When coordination data center 10 receives the location message, location unit 52 of coordination data center 10 stores the location data specified by the location message in location database 46 (264). In this way, participating device 8A sends and coordination data center 10 receives new location data indicating a new location of participating device 8A. Receiving location data from participating devices 8 before and after a disaster strikes an area can be advantageous for several reasons. For example, some of users 4 may be killed or seriously injured in the disaster and their mobile devices may be destroyed in the disaster. Consequently, it may only be possible to collect location data before the disaster affects the area. At the same time, it may be helpful to emergency response personnel and others users 6 to know the locations of users 4 after the disaster has stopped actively affecting the area so that emergency response personnel or others can know where to go to help users 4.

Figure 14:
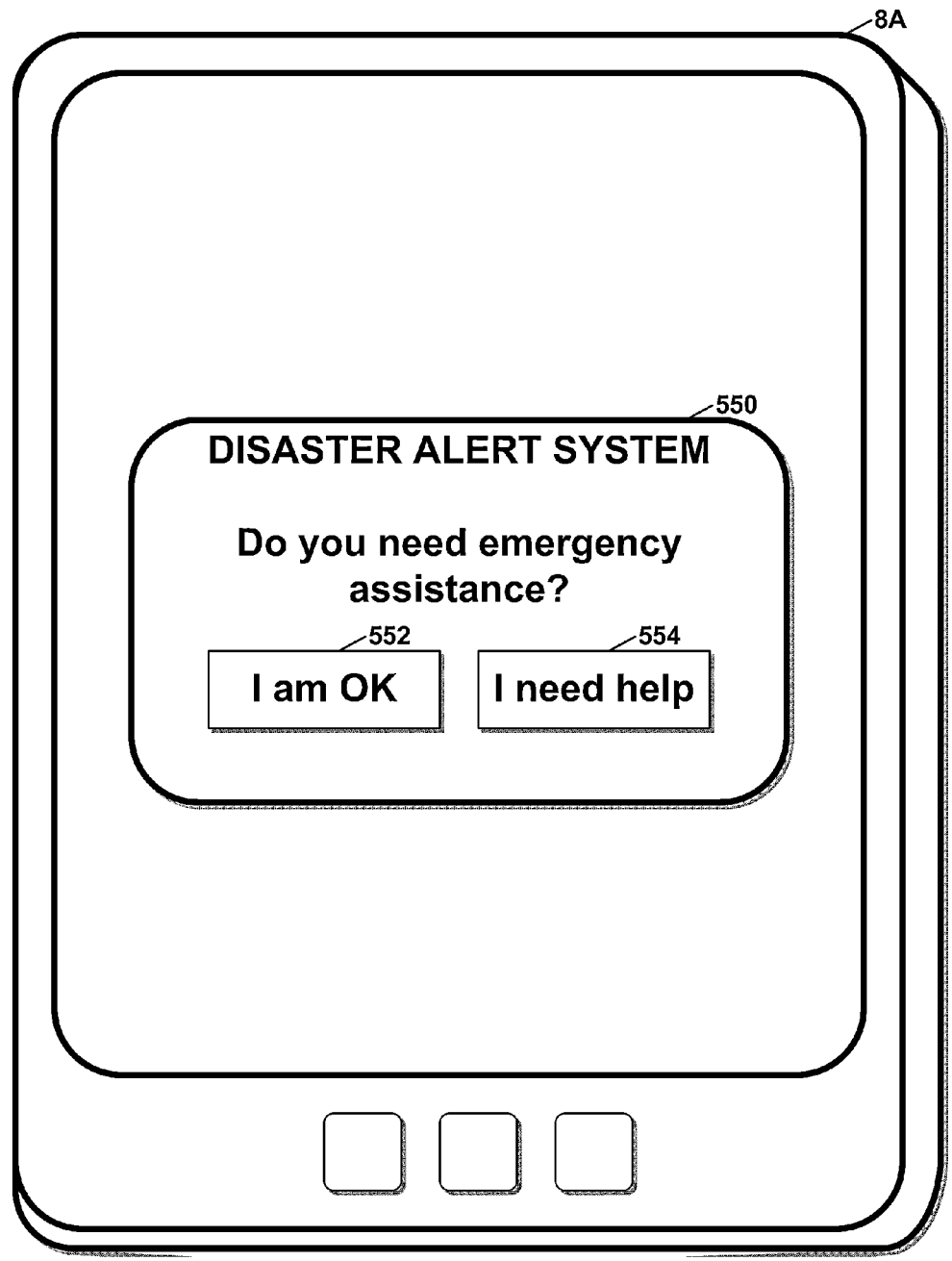
FIG. 14 illustrates an example user interface presented by the participating device that prompts a user to indicate whether the user needs emergency assistance.

Furthermore, after post-disaster unit 162 of participating device 8A receives the post-disaster message, post-disaster unit 162 prompts user 4A to indicate a status (266). For example, post-disaster unit 162 can prompt user 4A to indicate whether user 4A needs emergency assistance. In various examples, post-disaster unit 162 prompts user 4A to indicate whether user 4A needs emergency assistance in various ways. For example, post-disaster unit 162 can cause display unit 144 to display a user interface that contains instructions that request user 4A to indicate whether user 4A needs emergency assistance. In various examples where post-disaster unit 162 causes display unit 144 to display such a user interface, the user interface has various appearances. FIG. 14, described in detail elsewhere in this disclosure, illustrates an example user interface that prompts user 4A to indicate whether user 4A needs emergency assistance.

After post-disaster unit 162 prompts user 4A to indicate a status, post-disaster unit 162 receives status input from user 4A (268). The status input indicates whether user 4A needs emergency assistance. After post-disaster unit 162 receives the status input from user 4A, post-disaster unit 162 sends a status message to coordination data center 10 (270). The status message indicates whether user 4A needs emergency assistance. In some examples, the status message can include additional information that indicates what type of emergency assistance user 4A needs. For example, the status message can include information indicating that user 4A needs emergency medical assistance. In another example, the status message can include information indicating that user 4A needs emergency firefighting assistance. In yet another example, the status message can include information indicating that user 4A needs emergency law enforcement assistance. User 4A may need emergency law enforcement assistance in various situations, such as when looting breaks out in the wake of a disaster.

In various examples, post-disaster unit 162 formats the status message in various ways. For example, post-disaster unit 162 can format the status message as one or more HTTP messages. In another example, post-disaster unit 162 can format the status message as one or more SMS messages.

Subsequently, coordination data center 10 receives the status message from participating device 8A (272). After coordination data center 10 receives the status message, network interface 40 uses status unit 60 to store the status of user 4A in status database 48 (274). In various examples, post-disaster unit 58 stores the status of user 4A in status database 48 in various ways. For example, status database 48 can comprise one or more XML documents. In this example, status database 48 can store the status of user 4A as one or more XML elements in the one or more XML documents. In another example, status database 48 can comprise a relational database. In this example, post-disaster unit 58 stores the status of user 4A as one or more records in one or more tables of the relational database.

Figure 8:
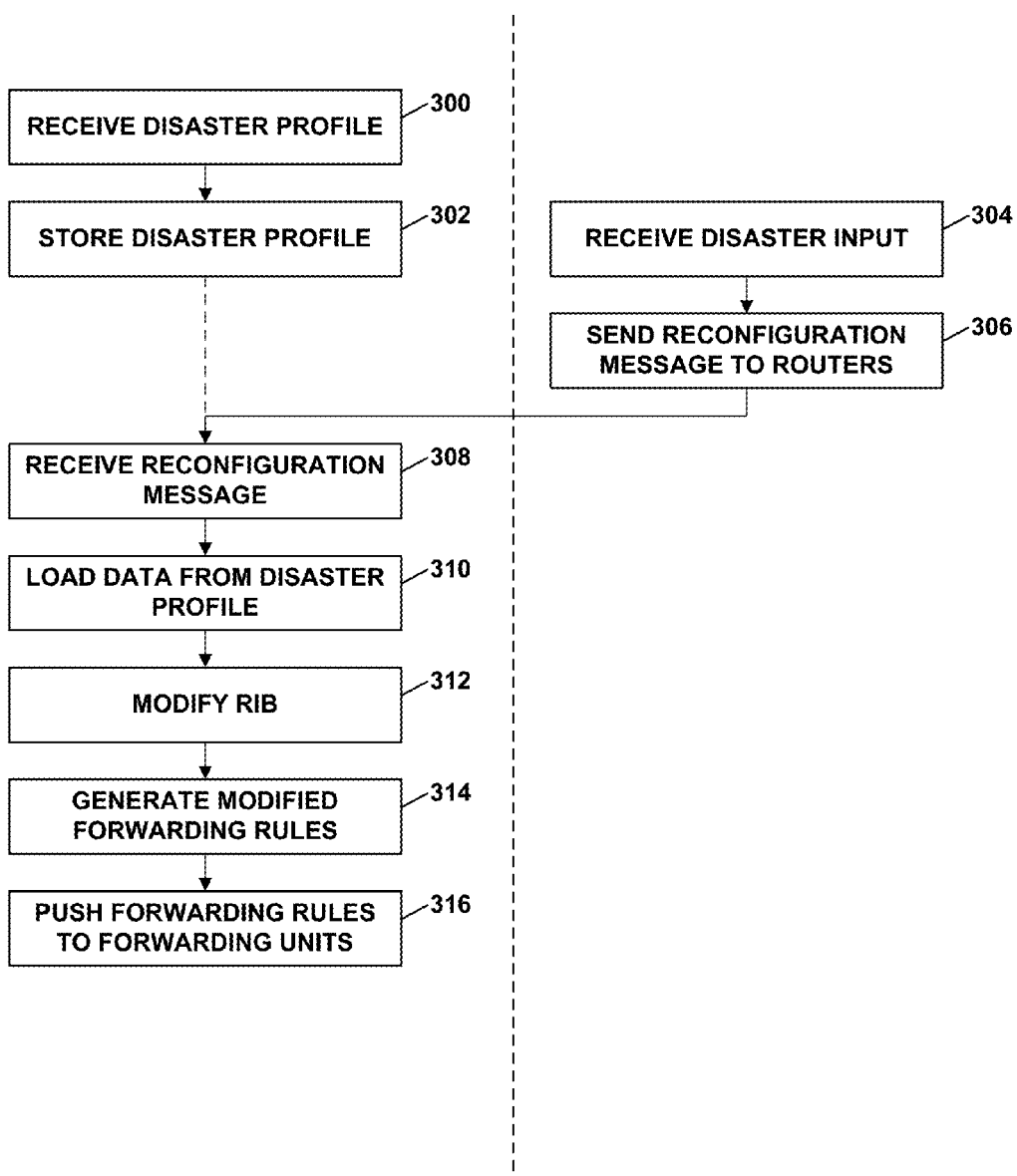
FIG. 8 is a flowchart that illustrates an example operation in which the coordination data center and the router interact.

FIG. 8 is a flowchart that illustrates an example operation in which coordination data center 10 and router 18A interact. Although the example of FIG. 8 illustrates an example operation of router 18A, readers will understand that other ones of routers 18 can perform similar operations. Moreover, readers will understand that other ones of routers 18 can perform different operations. Furthermore, in other examples, a server separate from the server that interacts with participating devices 8 interacts with routers 18.

As illustrated in the example of FIG. 8, router 18A receives disaster profile 182 (300). In various examples, router 18A receives disaster profile 182 from various sources. For example, router 18A can receive disaster profile 182 from coordination data center 10 using, for example, a configuration protocol (e.g., SNMP) or a routing protocol (e.g., the Border Gateway Protocol) that has been extended to include disaster profile 182 in NLRI information. In another example, router 18A can receive disaster profile 182 from a computing device used by emergency management authority 20 using other types of protocols.

Disaster profile 182 includes various data, such as data indicating sets of IP addresses associated with particular areas. In another example, disaster profile 182 can include data indicating sets of IP addresses associated with a particular area affected by a disaster. In yet another example, disaster profile 182 can include data indicating sets of IP addresses associated with emergency response authorities. In yet another example, disaster profile 182 can include data that associates IP addresses of routers 18 with geographical locations of routers 18.

Furthermore, router 18A may receive disaster profile 182 at various times. For instance, in the example of FIG. 8, router 18A receives disaster profile 182 prior to router 18A receiving a reconfiguration message from coordination data center 10. In another example, router 18A receives disaster profile 182 along with or within the reconfiguration message. In yet another example, router 18A sends a request for disaster profile 182 after receiving the reconfiguration message. In this example, router 18A receives disaster profile 182 in response to the request.

After router 18A receives disaster profile 182, router 18A stores disaster profile 182 (302). In various examples, router 18A stores disaster profile 182 in various formats. For example, router 18A can store disaster profile 182 as one or more XML documents, records in one or more relational databases, or in one or more other formats.

Coordination data center 10 receives disaster input from emergency management authority 20 (304). As discussed above with regard to the example of FIG. 6, coordination data center 10 can receive the disaster input from emergency management authority 20 in various ways. After coordination data center 10 receives the disaster input, alert unit 56 sends reconfiguration messages to routers 18 (306). In various examples, the reconfiguration messages include various types of data. For example, the reconfiguration messages can include data indicating an area affected by the disaster. In another example, the reconfiguration messages can include lists of routers in an area affected by the disaster. In yet another example, the reconfiguration messages can include data that indicate amounts of time that routers 18 are to use disaster profile 182.

In various examples, alert unit 56 formats the disaster reconfiguration message in various ways. For example, alert unit 56 formats the disaster reconfiguration message as a HTTP request. In another example, alert unit 56 formats the disaster reconfiguration message as a RPC protocol message.

After alert unit 56 sends the disaster reconfiguration messages, router 18A receives one of the reconfiguration messages (308). In some examples, a series of one or more packets addressed to router 18A contains the reconfiguration message. In such examples, FIBs 186 include forwarding rules that instruct forwarding units 184 to forward packets addressed to router 18A to routing plane 170. In this way, disaster unit 180 receives the reconfiguration message.

When router 18 receives the reconfiguration message, disaster unit 180 loads data from disaster profile 182 (310). In various examples, disaster unit 180 loads various types of data from disaster profile 182. For example, the reconfiguration message can specify that a disaster is about to affect or has affected a given area. Furthermore, in this example, disaster profile 182 can include data indicating IP addresses of routers in various areas. In this example, disaster unit 180 can load the IP addresses of routers in the given area.

After loading data from disaster profile 182, disaster unit 180 modifies RIB 178 based on the data loaded from disaster profile 182 (312). In various examples, disaster profile 182 modifies RIB 178 in various ways. For example, the reconfiguration message can indicate that certain ones of routers 18 are disabled because of the disaster. In this example, disaster unit 180 modifies RIB 178 such that RIB 178 does not specify routes through routers 18 that are disabled by the disaster. Accordingly, router 18A may not need to consume time determining that particular ones of routers 18 are disabled. Consequently, router 18A may be able to route packets by alternate routes more quickly.

In another example, disaster unit 180 can modify RIB 178 such that RIB 178 does not route traffic destined for computing devices outside an area affected by the disaster through routers 18 in the area affected by the disaster. In this way, the resources of routers 18 in the affected area are not consumed by transferring packets that are not destined for or generated in the affected area. Consequently, routers 18 in the affected area may be able to route packets destined for or generated in the affected area more quickly.

Figure 9:
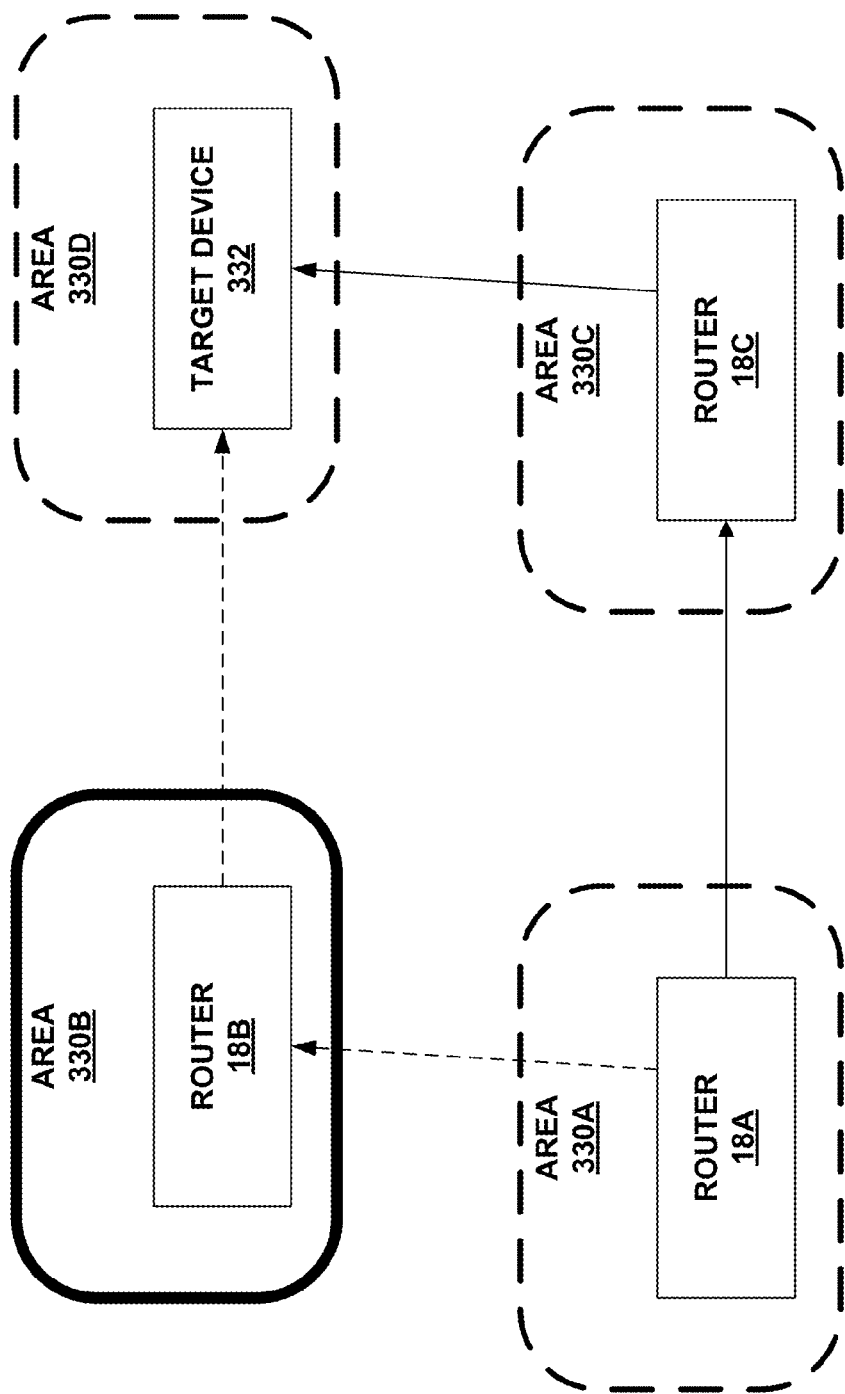
FIG. 9 is a block diagram that illustrates an example effect of re-routing traffic.

FIG. 9 is a block diagram that illustrates an example effect of re-routing traffic. In the example of FIG. 9, router 18A is located in an area 330A, router 18B is located in an area 330B, router 18C is located in an area 330C, and a target device 332 is located in an area 330D. In the example of FIG. 9, router 18A is initially configured to route packets destined for target device 332 through router 18B. However, router 18A can receive a reconfiguration message that indicates that a disaster is about to affect or has affected area 330B. Accordingly, in the example of FIG. 9, disaster unit 180 can modify RIB 178 such that router 18A routes packets destined for target device 332 through router 18C instead of through router 18B. In this way, packets destined for target device 332 continue to reach target device 332 even though the packets may pass through a more expensive (e.g., slower) route.

Continuing reference is now made to the example of FIG. 8. After disaster unit 180 modifies data in RIB 178, routing engine 176 generates modified forwarding rules (314). Routing engine 176 generates the modified forwarding rules based at least in part on data in RIB 178. After routing engine 176 generates the modified forwarding rules, routing engine 176 causes FIBs 186 to store the modified forwarding rules (316). As described with regard to the example of FIG. 10, forwarding units 184 use the modified forwarding rules to determine how to forward packets received by forwarding units 184.

Figure 10:
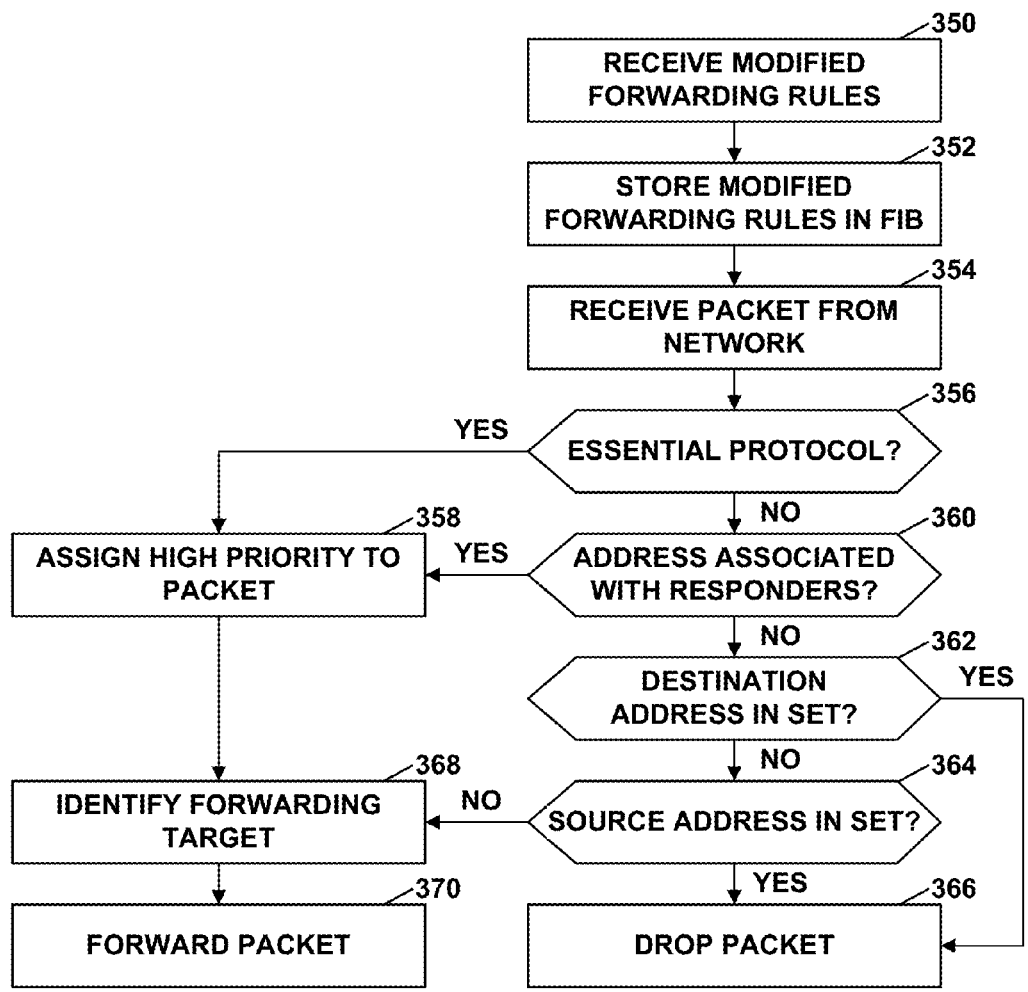
FIG. 10 is a flowchart illustrating an example operation of a forwarding unit.

FIG. 10 is a flowchart illustrating an example operation of forwarding unit 184A. Although the example of FIG. 10 illustrates an example operation of forwarding unit 184A, readers will understand that other ones of forwarding units 184 can perform similar operations. Moreover, readers will understand that other ones of forwarding units 184 can perform different operations.

Forwarding unit 184A receives modified forwarding rules from routing engine 176 (350). After receiving the modified forwarding rules, forwarding unit 184A stores the modified forwarding rules in FIB 186A (352).

Subsequently, IFC 188A of forwarding unit 184A receives a packet from network 14 (354). After receiving the packet, forwarding unit 184A applies the forwarding rules stored in FIB 186A to the packet. In the example of FIG. 10, applying the forwarding rules stored in FIB 186A causes forwarding unit 184A to perform a series of steps to determine whether to assign high priority to the packet.

To determine whether to assign high priority to the packet, forwarding unit 184A first determines whether the payload of the packet belongs to an essential protocol (356). In various examples, the forwarding rules indicate that various protocols are essential or non-essential protocols. For example, the forwarding rules can indicate that protocols used by emergency response personnel are essential protocols. In another example, the forwarding rules can indicate that a protocol carrying messages to and from coordination data center 10 is an essential protocol. In yet another example, the forwarding rules can indicate that a protocol for carrying voice or video data is a non-essential protocol. In yet another example, the forwarding rules can indicate that a protocol for carrying video game data is a non-essential protocol.

If the payload of the packet belongs to an essential protocol ("YES" of 356), forwarding unit 184A assigns high priority to the packet (358). In various examples, assigning high priority to the packet can have various results. For example, each of forwarding units 184 can have multiple queues. When forwarding units 184 receive a packet from other ones of forwarding units 184 or from routing plane 170, forwarding units 184 add the packet to one of these queues. Forwarding units 184 send packets on network 14 by selecting packets from the queues and then sending the selected packets. In this example, the queues are associated with different priority levels. Forwarding units 184 can disproportionately select packets from queues associated with high priority levels. Thus, forwarding units 184 may forward packets in the queues associated with high priority levels sooner than packets in queues associated with low priority levels. In this way, the throughput of router 18A is greater for packets in high priority queues than for packets in low priority queues. In this example, forwarding unit 184A can assign a high priority to the packet by attaching a flag to the packet. When another one of forwarding units 184 receives the packet from forwarding unit 184A, the other forwarding unit 184 places the packet in a high priority queue because the flag is attached to the packet.

If the payload of the packet does not belong to an essential protocol ("NO" of 356), forwarding unit 184A determines whether either the source address or the destination address of the packet is in a set of addresses associated with emergency response personnel (360). If the source or destination address of the packet is in a set of addresses associated with emergency response personnel ("YES" of 360), forwarding unit 184A assigns high priority to the packet (358). In this way, the emergency response personnel may be able to send and receive data over network 14 more quickly.

If neither the source address nor the destination address of the packet is in a set of addresses associated with emergency response personnel ("NO" of 360), forwarding unit 184A determines whether a destination address of the packet is in a set of addresses associated with an area affected by the disaster (362). If the destination address of the packet is not in a set of addresses associated with the area affected by the disaster ("NO" of 362), forwarding unit 184A determines whether the source address of the packet is within a set of addresses associated with the area affected by the disaster (364). If either the source address of the packet is within the set of addresses associated with the affected area ("YES" of 358) or the destination address of the packet is within the set of addresses associated with the affected area ("YES" of 356), forwarding unit 184A drops the packet (366). In other words, forwarding unit 184A does not forward the packet. In this way, forwarding unit 184A does not contribute to the utilization of the network infrastructure in the affected area for non-essential packets. In this way, forwarding unit 184A may, in effect, adjust the bandwidth available for other uses, such as increasing the bandwidth available for use by emergency response personnel.

If neither the source or destination address of the packet is in a set of addresses associated with the affected area ("NO" of 364), forwarding unit 184A uses the forwarding rules in FIB 186A to identify a forwarding target for the packet (368). For example, forwarding unit 184A can use the forwarding rules in FIB 186A to determine that the packet is to be forwarded from forwarding unit 184N. Forwarding unit 184A also uses the forwarding rules in FIB 186A to identify the forwarding target for the packet after forwarding unit 184A assigns a high priority to the packet.

After forwarding unit 184 identifies the forwarding target for the packet, forwarding unit 184A forwards the packet to the forwarding target (370). For example, if forwarding unit 184N is the forwarding target, forwarding unit 184 forwards the packet to forwarding unit 184N.

In other examples, forwarding unit 184 applies other forwarding rules. For example, forwarding unit 184A can apply forwarding rules that drop packets for initiating phone calls to devices within the affected area, but do not drop packets for initiating phone calls by devices within the affected area. In another example, forwarding unit 184A can apply forwarding rules that prioritize traffic to and from devices in the affected area.

Figure 11:
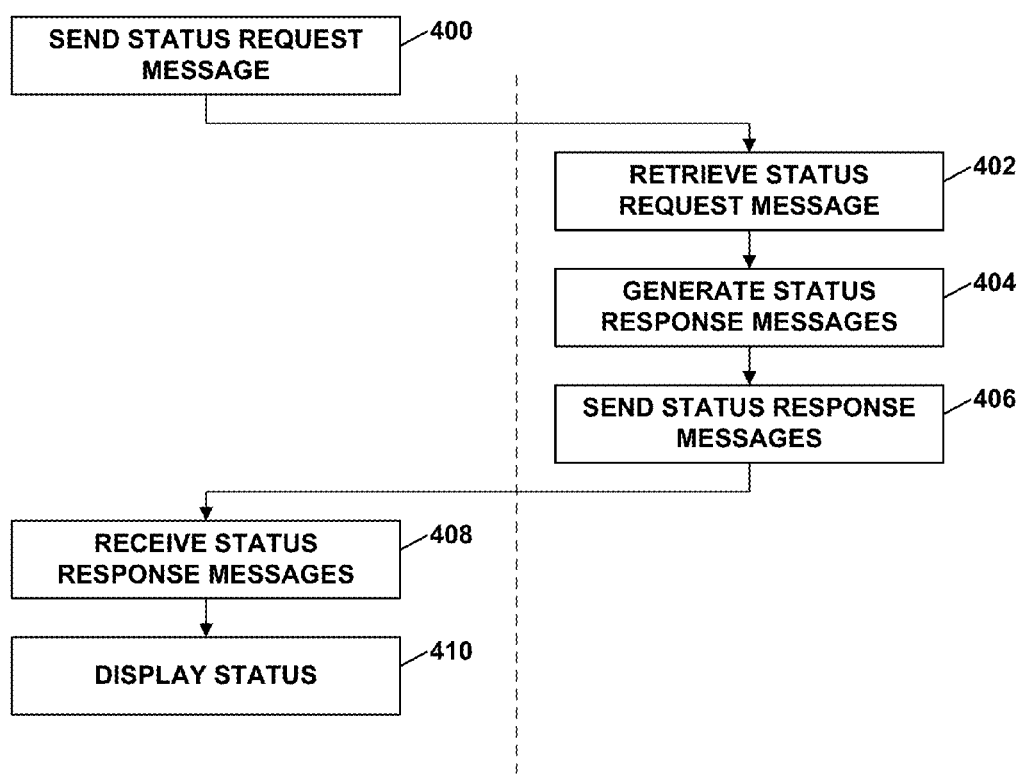
FIG. 11 is a flowchart illustrating an example interaction between a client device and the coordination data center to display status data to a user.

FIG. 11 is a flowchart illustrating an example interaction between client device 12A and coordination data center 10 to display status data to user 6A. Although the example of FIG. 11 illustrates an example operation of client device 12A, readers will understand that other ones of client devices 12 can perform similar operations. Moreover, readers will understand that other ones of client devices 12 can perform different operations. Furthermore, in other examples, client devices 12 can perform similar operations with regard to a server separate from the server that receives location data and status data from participating devices 8.

As illustrated in the example of FIG. 11, client device 12A sends a status request message to coordination data center 10 (400). The status request message comprises a request to learn a post-disaster status of one or more of users 4.

In various embodiments, client device 12A sends the status request message in response to various events. For example, client device 12A can send the status request message to coordination data center 10 in response to user 6A selecting one or more controls in a web page displayed by client device 12A. In this example, client device 12A can send the status request message as a HTTP message. In another example, client device 12A can send the status request message to coordination data center 10 as an SMS message.

After client device 12A sends the status request message, coordination data center 10 receives the status request message (402). After receiving the status request message, network interface 40 of coordination data center 10 uses analysis unit 62 to generate one or more status response messages to client device 12A (404). Network interface 40 sends the one or more status response message to client device 12A (406). In various examples, the status response messages include various types of data. For example, the one or more status response messages contain data that indicate the names, locations, and statuses of one or more of users 4.

In various examples, the status response message has various formats. For example, the status response message can comprise data that represents a web page that specifies the post-disaster status of one or more of users 4. In another example, the status response message can be a SMS message.

Figure 15:
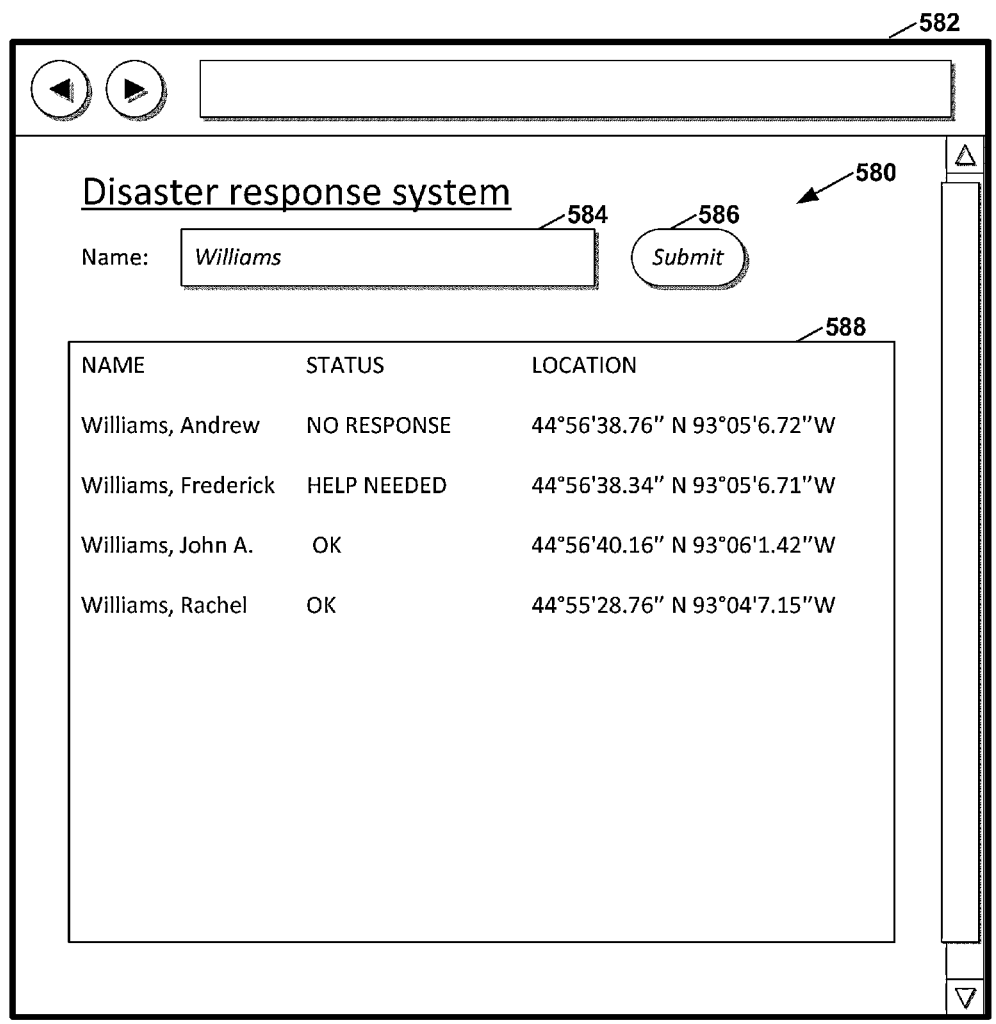
FIG. 15 illustrates an example status review interface.

Client device 12A receives the one or more status response messages after network interface 40 sends the one or more status response messages (408). After receiving the status response messages, client device 12A processes data in the status response messages to display statuses of one or more of users 4 (410). In various examples, client device 12A can display the post-disaster statuses of users 4 in various ways. For example, client device 12A can display a notification window containing the post-disaster statuses of users 4. In another example, client device 12A can display a webpage containing the statuses of users 4. FIG. 15, described in detail elsewhere in this disclosure, illustrates an example status review interface that lists names, statuses, and locations of users 4.

In this way, users 6 can learn from coordination data center 10 whether particular ones of users 4 are in need of assistance. Because users 6 can learn whether particular ones of users 4 are in need of assistance, it may be unnecessary for users 6 to make phone call to users 4. Furthermore, it may be unnecessary for users 4 in the area affected by the disaster to make phone calls to users 6. As a result, the communications infrastructure in the affected area may not be overloaded with phone calls. Consequently, more resources of the communications infrastructure may be free to handle communications between emergency response personnel.

Figure 12:
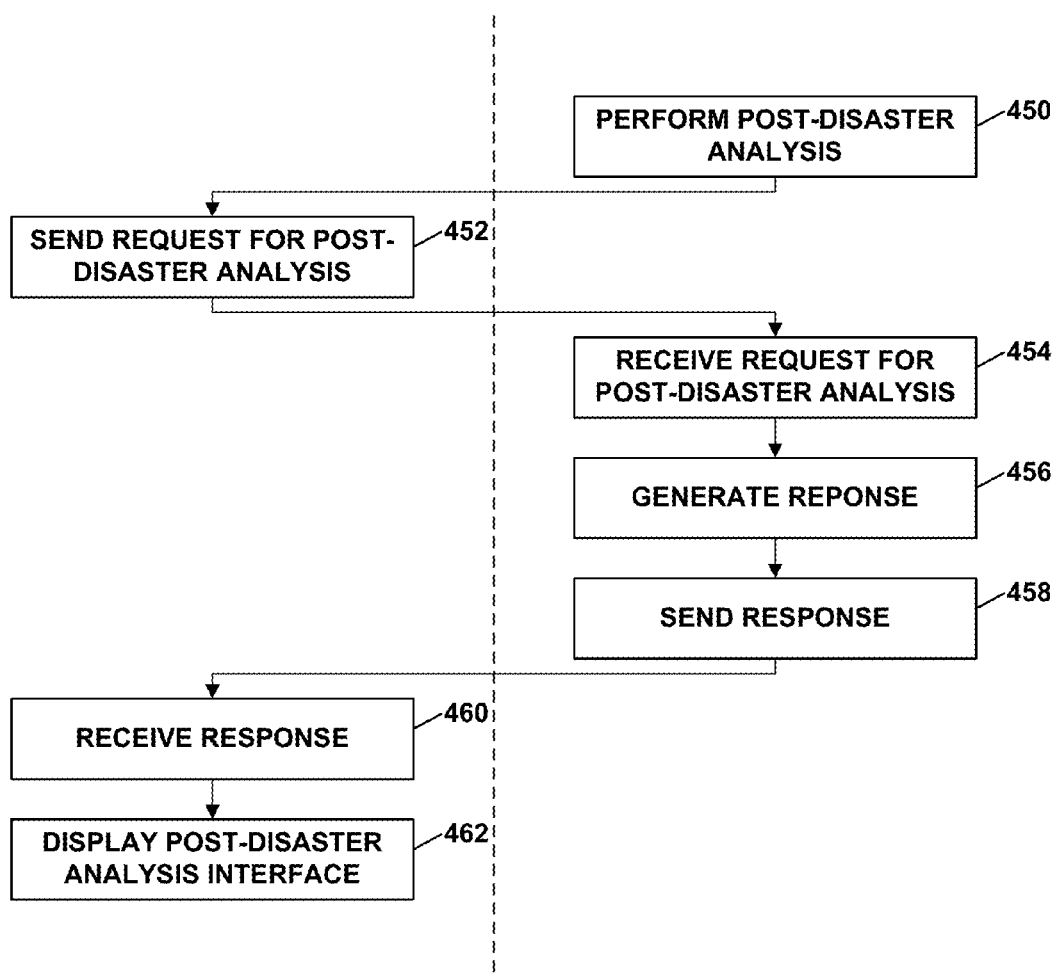
FIG. 12 is a flowchart illustrating an example interaction between the client device and the coordination data center to display post-disaster analysis data to a user.

FIG. 12 is a flowchart illustrating an example interaction between client device 12A and coordination data center 10 to display post-disaster analysis data to user 6A. Although the example of FIG. 12 illustrates an example operation of client device 12A, readers will understand that other ones of client devices 12 can perform similar operations. Moreover, readers will understand that other ones of client devices 12 can perform different operations.

Analysis unit 62 of coordination data center 10 performs a post-disaster analysis (450). In some example, analysis unit 62 uses data in registration database 44, location database 46, and status database 48, and/or other data sources to perform the post-disaster analysis.

In various examples, analysis performs various types of post-disaster analysis. For example, analysis unit 62 can use data in registration database 44, location database 46, and status database 48 to identify areas where users 4 who need emergency assistance are concentrated. In this example, analysis unit 62 can assume that users 4 who did not respond to prompting to indicate whether they need emergency assistance in fact need emergency assistance. Such concentrations may be associated with areas especially hard hit by the disaster. By identifying such concentrations, analysis unit 62 may be able to assist emergency response personnel allocate their resources.

In another example, analysis unit 62 can use data in registration database 44, location database 46, and status database 48 to assemble lists of missing people. Emergency response personnel may try to call or otherwise establish communication with people on the list of missing people. This may be more efficient than waiting for other people to report people as being missing.

In various examples, analysis unit 62 performs the post-disaster analysis in response to various events. For example, analysis unit 62 can perform the post-disaster analysis in response to coordination data center receiving post-disaster input from emergency management authority 20. In another example, analysis unit 62 can perform the post-disaster analysis days, months, or years after the disaster. In the example of FIG. 12, analysis unit 62 performs the post-disaster analysis before receiving a request for data based on the post-disaster analysis. In other examples, analysis unit 62 performs the post-disaster analysis in response to receiving a request for data based on the post-disaster analysis.

In the example of FIG. 12, client device 12A sends a request for data based on a post-disaster analysis to coordination data center 10 (452). In various examples, client device 12A formats the request in various ways. For example, client device 12A can format the request as an HTTP request, an RPC request, or a request in another communication protocol.

After client device 12A sends the request, coordination data center 10 receives the request (454). When client device 12A receives the request, network interface 40 uses analysis unit 62 to generate a response that contains data based on the post-disaster analysis (456). Network interface 40 then sends the response to client device 12A (458). In various examples, analysis unit 62 formats the data in the response in various ways. For example, analysis unit 62 can format the data as one or more XML or HTML documents.

Figure 16:
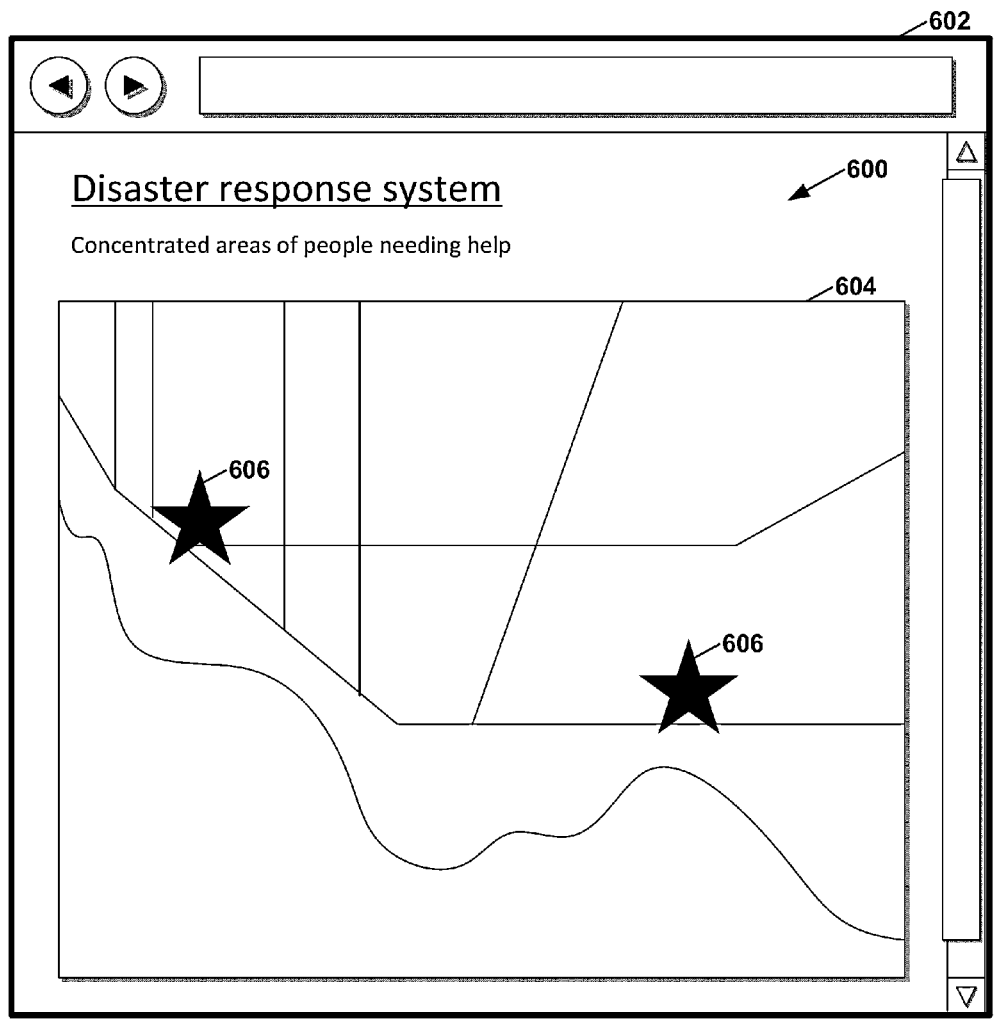
FIG. 16 illustrates an example analysis interface.

Client device 12A receives the response from coordination data center 10 (460). After receiving the response, client device 12A displays an analysis interface (462). The analysis interface contains data based on the post-disaster analysis data received from coordination data center 10. In various examples, the analysis interface has various appearances and contains various types of information. FIG. 16, described in detail elsewhere in this disclosure, illustrates an example analysis interface.

FIG. 13 illustrates an example interface 500 presented by participating device 8A. Although the example of FIG. 13 illustrates participating device 8A, readers will understand that other ones of participating devices 8 can display similar user interfaces. Moreover, readers will understand that other ones of participating devices 8 can display different interfaces.

In the example of FIG. 13, user interface 500 is a popup window containing a message that alerts user 4A that a tsunami is approaching. User interface 500 also includes directions 502 that may help user 4A move to a location where user 4A may be able to escape the disaster.

FIG. 14 illustrates an example user interface 550 presented by participating device 8A that prompts user 4A to indicate whether user 4A needs emergency assistance. Although the example of FIG. 14 illustrates participating device 8A, readers will understand that other ones of participating devices 8 can display similar user interfaces. Moreover, readers will understand that other ones of participating devices 8 can display different interfaces to indicate whether user 4A needs emergency assistance.

In the example of FIG. 14, user interface 550 is a popup window containing a message that prompts user 4A to indicate whether user 4A needs emergency assistance. In addition, user interface 550 includes an "I am OK" control 552 and an "I need help" control 554. If user 4A selects the "I am OK" control 552, participating device 8A sends a status message indicating that user 4A does not need emergency assistance. If user 4A selects the "I need help" control 554, participating device 8A sends a status message indicating that user 4A needs emergency assistance.

FIG. 15 illustrates an example status review interface 580. In the example of FIG. 15, status review interface 580 is presented within a browser window 582. Status review interface 580 includes a search feature 584. Users 6 can enter names in search feature 584. In the example of FIG. 15, the name "Williams" has been entered into search feature 584. After entering names in search feature 584, users 6 can select a submit button 586. When users 6 select submit button 586, client devices 12 send status request messages to coordination data center 10. In response to the status request messages, coordination data center 10 sends data indicating names, statuses, and locations of one or more people having the name entered in search feature 584. Status review interface 580 includes an area 588 that displays the names, statuses, and locations of people having the name entered in search feature 584.

FIG. 16 illustrates an example analysis interface 600. In the example of FIG. 16, analysis interface 600 is presented within a browser window 602. Analysis interface 600 includes a map 604 of an area affected by a disaster. The map 604 includes stars 606 indicating areas where users 4 who need emergency assistance are concentrated. In some examples, analysis unit 62 identifies such areas based on information in location database 46 and status database 48. Emergency response personnel may find it useful to know the areas where users 4 who need emergency assistance are concentrated in order to know how to deploy resources.

Figure 17:
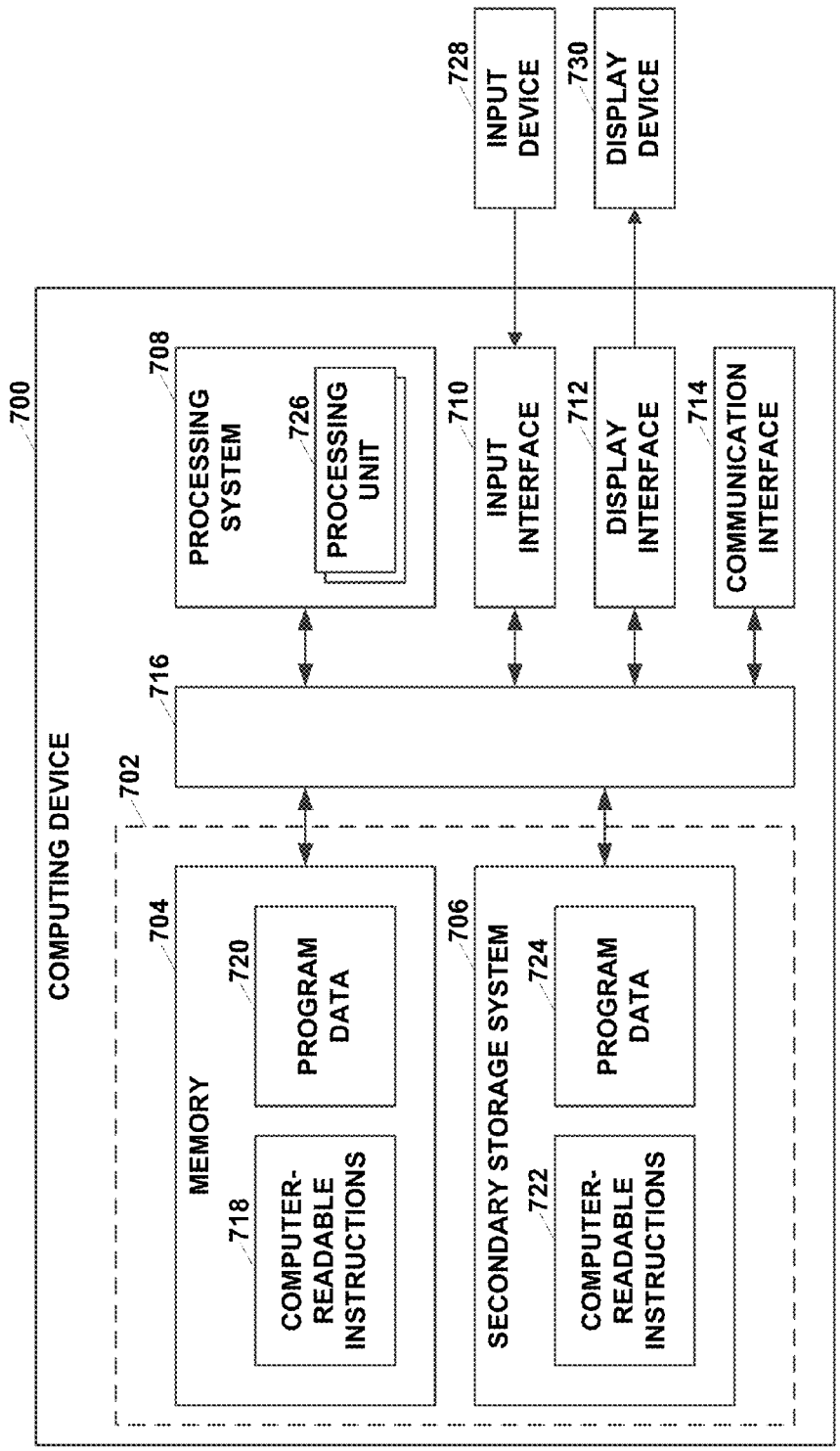
FIG. 17 is a block diagram illustrating an example configuration of a computing device.

FIG. 17 is a block diagram illustrating an example configuration of a computing device 700. Computing device 700 is a physical device that processes information. In some examples, participating devices 8A, coordination data center 10, and client devices 12 comprise one or more computing devices having configurations similar to computing device 700.

Computing device 700 comprises a data storage system 702, a memory 704, a secondary storage system 706, a processing system 708, an input interface 710, a display interface 712, a communication interface 714, and one or more communication media 716. Communication media 716 enable data communication between processing system 708, input interface 710, display interface 712, communication interface 714, memory 704, and secondary storage system 706. Readers will understand that computing device 700 can include components in addition to those shown in the example of FIG. 17. Furthermore, readers will understand that some computing devices do not include all of the components shown in the example of FIG. 17.

A computer-readable medium is a medium from which processing system 708 can read data. The term computer-readable media can refer to computer storage media and communications media. Computer storage media include physical devices that store data for subsequent retrieval. Computer storage media are not transitory. For instance, computer storage media do not exclusively comprise propagated signals. Computer storage media include volatile storage media and non-volatile storage media. Example types of computer storage media include random-access memory (RAM) units, read-only memory (ROM) devices, solid state memory devices, optical discs (e.g., compact discs, DVDs, BluRay discs, etc.), magnetic disk drives, magnetic tape drives, and other types of devices that store data for subsequent retrieval. Communication media include media over which one device can communicate data to another device. Example types of communication media include communication networks, communications cables, wireless communication links, communication buses, and other media over which one device is able to communicate data to another device.

Data storage system 702 is a system that stores data for subsequent retrieval. In the example of FIG. 8, data storage system 702 comprises memory 704 and secondary storage system 706. Memory 704 and secondary storage system 706 store data for later retrieval. In the example of FIG. 17, memory 704 stores computer-readable instructions 718 and program data 720. Secondary storage system 706 stores computer-readable instructions 722 and program data 724. Physically, memory 704 and secondary storage system 706 each comprise one or more computer storage media.

Processing system 708 is coupled to data storage system 702. Processing system 708 reads and executes computer-readable program instructions. Execution of the computer-readable instructions by processing system 708 causes computing device 700 to perform the actions indicated by the computer-readable instructions. For example, execution of the computer-readable instructions by processing system 708 can cause computing device 700 to provide Basic Input/Output Systems, operating systems, system programs, application programs, or can cause computing device 700 to provide other functionality. In another example, execution of the computer-readable instructions by processing system 708 can cause computing device 700 to provide application 150. In yet another example, execution of the computer-readable instructions by processing system 708 can cause computing device 700 to provide network interface 40 and message processing units 42 of coordination data center 10/

Processing system 708 reads the computer-readable instructions from one or more computer-readable media. For example, processing system 708 can read and execute computer-readable instructions 718 and 722 stored on memory 704 and secondary storage system 706.

Processing system 708 comprises one or more processing units 726. Processing units 726 comprise physical devices that execute computer-readable instructions. Processing units 726 can comprise various types of physical devices that execute computer-readable instructions. For example, one or more of processing units 726 can comprise a microprocessor, a processing core within a microprocessor, a digital signal processor, a graphics processing unit, a general-purpose graphics processing unit, or another device or physical device that executes computer-readable instructions.

Input interface 710 enables computing device 700 to receive input from an input device 728. Input device 728 comprises a device that receives input from a user. Input device 728 can comprises various types of devices that receive input from users. For example, input device 728 can comprise a keyboard, a touch screen, a mouse, a microphone, a keypad, a joystick, a brain-computer interface device, or another type of device that receives input from a user. In some instances, input device 728 is integrated into a housing of computing device 700. In other instances, input device 728 is outside a housing of computing device 700.

Display interface 712 enables computing device 700 to display output on a display device 730. Display device 730 is a device that displays output. Example types of display devices include monitors, touch screens, display screens, televisions, and other types of devices that display output. In some instances, display device 730 is integrated into a housing of computing device 700. In other instances, display device 730 is outside a housing of computing device 700.

Communication interface 714 enables computing device 700 to send and receive data over one or more communication media. Communication interface 714 can comprise various types of devices. For example, communication interface 714 can comprise a Network Interface Card (NIC), a wireless network adapter, a Universal Serial Bus (USB) port, or another type of device that enables computing device 700 to send and receive data over one or more communication media.

Various embodiments of the invention have been described. These and other embodiments are within the scope of the following claims.

What is claimed is:

1. A method comprising:
   receiving map data at a participating device before the participating device receives a disaster alert message;
   storing the map data on the participating device before the participating device receives the disaster alert message;
   receiving the disaster alert message at the participating device;
   in response to receiving the disaster alert message:
      sending location data to a coordination data center automatically, the location data indicating a current geographical location of the participating device; and
      using the map data to determine an escape route for a user of the participating device;
   receiving a post-disaster message at the participating device after the disaster has stopped actively affecting an area that includes the current geographical location of the participating device;
   in response to the post-disaster message, sending new location data from the participating device to the coordination data center, the new location data indicating a new geographical location of the participating device; and
   in response to the post-disaster message, sending status data from the participating device to the coordination data center, the status data indicating whether the user of the participating device needs emergency assistance.

2. The method of claim 1, further comprising:
   receiving guidance data at the participating device before the participating device receives the disaster alert message;
   storing the guidance data on the participating device before the participating device receives the disaster alert message; and
   in response to receiving the disaster alert message, using the guidance data to present response instructions to the user, the response instructions indicating how the user should respond to the disaster.

3. The method of claim 1, further comprising in response to the post-disaster message, prompting the user to indicate whether the user needs emergency assistance.

4. The method of claim 1, further comprising sending location messages to the coordination data center repeatedly prior to the participating device receiving the disaster alert message, the location messages that indicating geographical locations of the participating device.

5. A computing device that comprises circuitry configured to:
   store, in response to receiving map data before the computing device receives a disaster alert message, the map data;

send location data to a coordination data center automatically in response to receiving the disaster alert message, the location data indicating a geographical location of the computing device;

in response to receiving the disaster alert message, use the map data to determine an escape route for a user of the computing device;

send new location data to the coordination data center in response to receiving a post-disaster message after a disaster has stopped actively affecting an area, the new location data indicating a new geographical location of the computing device; and send status data to the coordination data center in response to the post-disaster message, the status data indicating whether the user of the computing device needs emergency assistance.

6. A non-transitory computer-readable storage medium comprising program instructions to cause a processor of a participating device to:

store, in response to receiving map data before the participating device receives a disaster alert message, the map data send location data to a coordination data center automatically in response to receiving the disaster alert message, the location data indicating a geographical location of the participating device;

in response to receiving the disaster alert message, use the map data to determine an escape route for a user of the participating device;

send new location data to the coordination data center in response to receiving a post-disaster message after a disaster has stopped actively affecting an area, the new location data indicating a new geographical location of the participating device; and send status data to the coordination data center in response to the post-disaster message, the status data indicating whether the user of the participating device needs emergency assistance.

7. A method comprising:

sending map data to a participating device before the participating device receives a disaster alert message, the participating device configured to store the map data on the participating device before the participating device receives the disaster alert message;

sending the disaster alert message to the participating device when the participating device is in an area affected by a disaster, the participating device configured to use the map data to determine an escape route for a user of the participating device in response to receiving the disaster alert message;

receiving a first location message from the participating device after sending the disaster alert message, the first location message indicating a location of the participating device;

sending a post-disaster message to the participating device after sending the disaster alert message to the participating device;

receiving new location data and status data from the participating device after sending the post-disaster message, the new location data indicating a new location of the participating device, the status data indicating whether the user of the participating device needs emergency assistance; and providing an interface to a user outside the area affected by the disaster, the interface containing data indicating whether the user of the participating device needs emergency assistance.

8. The method of claim 7, further comprising: before sending the disaster alert message to the participating device, identifying the participating device as being in the area affected by the disaster.

9. The method of claim 7, further comprising sending a message to a router, the message instructing the router to perform actions that adjust bandwidth available for a particular use.

10. The method of claim 9, wherein the actions that adjust bandwidth available for the particular use include dropping packets that have payloads belonging to non-essential protocols and also have either source addresses or destination addresses in sets of addresses associated with the area.

11. The method of claim 10, the non-essential protocols including protocols that carry voice data.

12. A coordination data center comprising a processing system that comprises one or more processing units that execute computer-readable instructions that cause the coordination data center to:

send map data to a participating device before the participating device receives a disaster alert message, the participating device configured to store the map data on the participating device before the participating device receives the disaster alert message;

send the disaster alert message to the participating device when the participating device is in an area affected by a disaster, the participating device configured to use the map data to determine an escape route for a user of the participating device in response to receiving the disaster alert message;

receive a first location message from the participating device after sending the disaster alert message, the first location message indicating a location of the participating device;

send a post-disaster message to the participating device after sending the disaster alert message to the participating device;

receive new location data and status data from the participating device after sending the post-disaster message, the new location data indicating a new location of the participating device, the status data indicating whether the user of the participating device needs emergency assistance; and provide an interface to a user outside the area affected by the disaster, the interface containing data indicating whether the user of the participating device needs emergency assistance.

13. A non-transitory computer-readable storage medium comprising program instructions to cause a processor of a computing device to:

send map data to a participating device before the participating device receives a disaster alert message, the participating device configured to store the map data on the participating device before the participating device receives the disaster alert message;

send the disaster alert message to the participating device when the participating device is in an area affected by a disaster, the participating device configured to use the map data to determine an escape route for a user of the participating device in response to receiving the disaster alert message;

store data indicating a location of the participating device after sending the disaster alert message, a first location message received by the computing device indicating the location of the participating device;

send a post-disaster message to the participating device after sending the disaster alert message to the participating device;

store new location data and status data received from the participating device after sending the post-disaster message, the new location data indicating a new location of the participating device, the status data indicating whether the user of the participating device needs emergency assistance; and provide an interface to a user outside the area affected by the disaster, the interface containing data indicating whether the user of the participating device needs emergency assistance.

14. A system comprising:

a plurality of participating devices;

a plurality of client devices; and a coordination data center that comprises a processing system comprising one or more processing units that execute instructions, execution of the instructions by the one or more processing units causing the coordination data center to:

send map data to participating devices before the participating devices receive disaster alert messages, the participating devices configured to store the map data on the participating devices before the participating devices receive the disaster alert messages;

send the disaster alert messages to applicable participating devices, the applicable participating devices being ones of the participating devices that are in an area affected by a disaster, the participating devices configured to use the map data to determine escape routes for users of the participating devices in response to receiving the disaster alert messages, the client devices being outside the area;

store initial location data for the applicable participating devices, the initial location data indicating locations of the applicable participating devices, the initial location data based on data received from the applicable participating devices after the coordination data center sends the disaster alert messages;

send post-disaster messages to the applicable participating devices after sending the disaster alert messages;

store new location data and status data, the new location data indicating new locations of the applicable participating devices, the status data indicating whether the users of the applicable participating devices need emergency assistance, the new location data and the status data based on data received from the applicable participating devices after the coordination data center sends the post-disaster messages; and provide to the client devices data indicating whether the users of the applicable participating devices need emergency assistance.

15. The system of claim 14, wherein the system further comprises a router, the router comprising:

a computer storage medium that stores a disaster profile;

a computer storage medium that stores a routing information base (RIB); and circuitry that uses data in the disaster profile to modify the RIB in response to the router receiving a reconfiguration message from the coordination data center; and wherein execution of the instructions by the processing system of the coordination data center further causes the coordination data center to send the reconfiguration message to the router in response to the coordination data center receiving input indicating that the disaster has affected or is about to affect the area.

16. The system of claim 14, wherein the router comprises circuitry that, after the router receives the reconfiguration message, drops packets that have payloads belonging to non-essential protocols and also have either source addresses or destination addresses in sets of addresses associated with the area.

* * * * *